United States Patent
Nam et al.

(10) Patent No.: US 11,675,531 B2
(45) Date of Patent: Jun. 13, 2023

(54) STORAGE DEVICE FOR HIGH SPEED LINK STARTUP AND STORAGE SYSTEM INCLUDING THE SAME

(71) Applicant: Samsung Electronics Co., Ltd., Suwon-si (KR)

(72) Inventors: Dongwoo Nam, Seongnam-si (KR); Sungho Seo, Suwon-si (KR); Kwanwoo Noh, Seoul (KR); Myungsub Shin, Suwon-si (KR); Haesung Jung, Hwaseong-si (KR)

(73) Assignee: Samsung Electronics Co., Ltd., Gyeonggi-do (KR)

(*) Notice: Subject to any disclaimer, the term of this patent is extended or adjusted under 35 U.S.C. 154(b) by 0 days.

(21) Appl. No.: 17/328,225

(22) Filed: May 24, 2021

(65) Prior Publication Data
US 2021/0397368 A1    Dec. 23, 2021

(30) Foreign Application Priority Data

Jun. 17, 2020   (KR) .................. 10-2020-0073919
Dec. 3, 2020    (KR) .................. 10-2020-0167668

(51) Int. Cl.
*G06F 13/42*    (2006.01)
*G06F 3/06*     (2006.01)
(Continued)

(52) U.S. Cl.
CPC .......... *G06F 3/0655* (2013.01); *G06F 3/0604* (2013.01); *G06F 3/0679* (2013.01);
(Continued)

(58) Field of Classification Search
CPC ............ G06F 13/1668; G06F 13/1678; G06F 13/1684; G06F 13/385; G06F 13/4072; G06F 13/4282
(Continued)

(56) References Cited

U.S. PATENT DOCUMENTS 7,679,133 B2    3/2010  Son et al.
8,553,466 B2   10/2013  Han et al.
(Continued)

FOREIGN PATENT DOCUMENTS

KR    20210144180 A  * 11/2021  .............. G06F 3/06
WO    WO-2012/049309 A1   4/2012

OTHER PUBLICATIONS

Extended European Search Report dated Jan. 21, 2022 for corresponding European Application No. 21179762.6.
(Continued)

*Primary Examiner* — Ilwoo Park
(74) *Attorney, Agent, or Firm* — Harness, Dickey & Pierce, P.L.C.

(57) ABSTRACT

A link startup method of a storage device connected to a host through a plurality of lanes includes performing an initialization operation in the storage device; establishing data communication through a connected transmission lane and a connected reception lane among the plurality of lanes; transmitting a high speed link up message to the host through the connected transmission lane of the storage device; and performing a link startup operation in a high speed mode through the connected transmission lane of the storage device and the connected reception lane of the host, based on the high speed link up message transmitted by the storage device.

17 Claims, 22 Drawing Sheets

(51) Int. Cl.
*G06F 13/16* (2006.01)
*G06F 13/38* (2006.01)

(52) U.S. Cl.
CPC ........ *G06F 13/1668* (2013.01); *G06F 13/385* (2013.01); *G06F 13/4278* (2013.01)

(58) Field of Classification Search
USPC .................... 710/10, 13, 14, 74, 104, 106
See application file for complete search history.

(56) References Cited

U.S. PATENT DOCUMENTS

| | | | |
|---|---|---|---|
| 8,559,235 | B2 | 10/2013 | Yoon et al. |
| 8,621,128 | B2 | 12/2013 | Radulescu et al. |
| 8,654,587 | B2 | 2/2014 | Yoon et al. |
| 9,086,966 | B2 | 7/2015 | Wagh et al. |
| 9,141,496 | B2 | 9/2015 | Radulescu |
| 9,904,651 | B2 | 2/2018 | Park |
| 10,185,696 | B2 | 1/2019 | Zhu et al. |
| 10,304,546 | B2 | 5/2019 | Han et al. |
| 10,572,427 | B2 | 2/2020 | Rosensprung et al. |
| 2009/0079760 | A1 | 3/2009 | Tu et al. |
| 2010/0220792 | A1 | 9/2010 | Kamito et al. |
| 2011/0233648 | A1 | 9/2011 | Seol et al. |
| 2014/0269471 | A1* | 9/2014 | Wagh ................... G06F 9/4418 370/311 |
| 2015/0070530 | A1 | 3/2015 | Tanaka et al. |
| 2016/0005488 | A1* | 1/2016 | Han ....................... G11C 16/20 365/185.18 |
| 2016/0034413 | A1* | 2/2016 | Park ..................... G06F 13/4265 710/105 |
| 2017/0181081 | A1* | 6/2017 | Kim ...................... H04L 7/0091 |
| 2020/0244488 | A1* | 7/2020 | Sugioka ............... H04L 25/026 |

OTHER PUBLICATIONS

Examination Report for corresponding Indian Application No. 201934037994 dated Jan. 28, 2022.

* cited by examiner

STORAGE DEVICE FOR HIGH SPEED LINK STARTUP AND STORAGE SYSTEM INCLUDING THE SAME

CROSS-REFERENCE TO RELATED APPLICATION

This application is based on and claims priority under 35 U.S.C. § 119 to Korean Patent Application Nos. 10-2020-0073919, filed on Jun. 17, 2020 and 10-2020-0167668, filed on Dec. 3, 2020, in the Korean Intellectual Property Office, the entire disclosures of which are incorporated by reference herein.

BACKGROUND

At least some example embodiments of the inventive concepts relate to apparatuses and methods, and more particularly, to a storage device for high speed link startup and a storage system including the same.

The storage system includes a host and the storage device. The host is connected to the storage device through various standard interfaces such as a universal flash storage (UFS) interface, a serial advanced technology attachment (SATA) interface, a small computer small interface (SCSI), a serial attached SCSI (SAS), and an embedded multi-media card (eMMC) interface. When the storage system is used in a mobile device, a high speed operation between the host and the storage device is very significant, and quick link startup between the host and the storage device is required.

SUMMARY

At least some example embodiments of the inventive concepts provide a storage device capable of performing link startup in a high speed mode between the storage device and a host and a storage system including the same. According to at least some example embodiments of the inventive concepts, a link startup method of a storage device connected to a host through a plurality of lanes includes performing an initialization operation in the storage device; establishing data communication through a connected transmission lane and a connected reception lane among the plurality of lanes; transmitting a high speed link up message to the host through the connected transmission lane of the storage device; and performing a link startup operation in a high speed mode through the connected transmission lane of the storage device and the connected reception lane of the host, based on the high speed link up message transmitted by the storage device.

According to at least some example embodiments of the inventive concepts, a link startup method of a host connected to a storage device through at least one lane includes performing initialization in a high speed mode in the host; establishing data communication through a connected transmission lane and a connected reception lane among the at least one lane; determining whether a high speed link up message is received from the storage device through the connected reception lane of the host; recognizing the connected reception lane through which the high speed link up message is received from the storage device, as a result of the determination; and performing a link startup operation in the high speed mode through the connected transmission lane of the storage device and the connected reception lane of the host, in response to the recognizing of the connected reception lane through which the high speed link up message is received.

According to at least some example embodiments of the inventive concepts, there is provided a storage device including: an interconnect part including at least one receiver and at least one transmitter, the interconnect part performing data communication through a transmission lane and a reception lane among at least one lane connected between a host device and the storage device; a nonvolatile memory; and a storage controller configured to control the nonvolatile memory, wherein the storage controller is further configured for the at least one transmitter to transmit high speed link up to the host device through the transmission lane, and configured to perform link startup in a high speed mode through the transmission lane and the reception lane based on the high speed link up when low speed link up is not received from the host device through the reception lane within a set time from the transmission of the high speed link up.

According to at least some example embodiments of the inventive concepts, there is provided a host device including an interconnect part including at least one receiver and at least one transmitter, wherein the interconnect part performs data communication through a transmission lane and a reception lane among at least one lane connected between the host device and a storage device, and the host device is configured to perform link startup in a high speed mode through the reception lane and the transmission lane when the at least one receiver determines whether to receive high speed link up from the storage device through the reception lane and receives the high speed link up from the storage device as a result of the determination.

BRIEF DESCRIPTION OF THE DRAWINGS

The above and other features and advantages of example embodiments of the inventive concepts will become more apparent by describing in detail example embodiments of the inventive concepts with reference to the attached drawings. The accompanying drawings are intended to depict example embodiments of the inventive concepts and should not be interpreted to limit the intended scope of the claims. The accompanying drawings are not to be considered as drawn to scale unless explicitly noted.

DETAILED DESCRIPTION OF THE EMBODIMENTS

Figure 1:
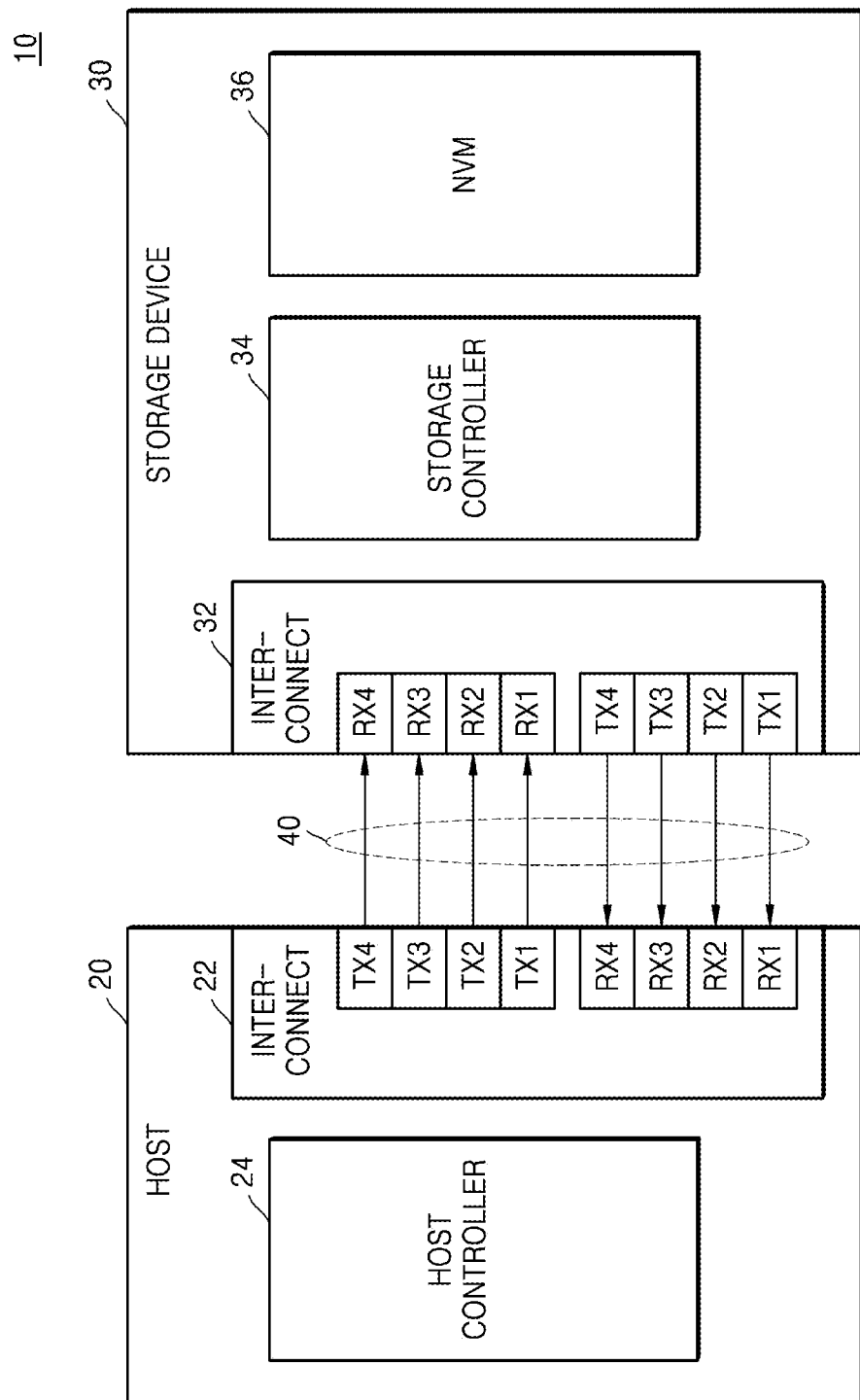
FIG. 1 is a block diagram of a storage system according to at least some example embodiments of the inventive concepts.

As is traditional in the field of the inventive concepts, embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the embodiments may be physically separated into two or more interacting and discrete blocks, units and/or modules without departing from the scope of the inventive concepts. Further, the blocks, units and/or modules of the embodiments may be physically combined into more complex blocks, units and/or modules without departing from the scope of the inventive concepts.

FIG. 1 is a block diagram of a storage system 10 according to at least some example embodiments of the inventive concepts.

Referring to FIG. 1, the storage system 10 may include a host 20 and a storage device 30. The host 20 and the storage device 30 may be connected to each other according to an interface protocol defined in a universal flash storage (UFS) specification, and accordingly, the storage device 30 may be a UFS storage device, and the host 20 may be a UFS host. However, at least some example embodiments of the inventive concepts are not limited thereto, and the storage device 30 and the host 20 may be connected to each other according to various standard interfaces.

The host 20 may control a data processing operation, e.g., a data read operation or a data write operation, on the storage device 30. The host 20 may indicate a data processing device capable of processing data, such as a central processing unit (CPU), a processor, a microprocessor, or an application processor (AP). The host 20 may perform an operating system (OS) and/or various application programs. According to at least one example embodiment of the inventive concepts, the storage system 10 may be included in a mobile device, and the host 20 may be implemented by an AP. According to at least one example embodiment of the inventive concepts, the host 20 may be implemented by a system-on-a-chip (SoC) and accordingly embedded in an electronic device.

Although in the present embodiment the host 20 and the storage device 30 are shown including a plurality of conceptual hardware components, the present embodiment is not limited thereto, and other components may be included. The host 20 may include an interconnect part 22 and a host controller 24. The interconnect part 22 may provide an interface 40 between the host 20 and the storage device 30. The interconnect part 22 may include a physical layer and a link layer. The physical layer of the interconnect part 22 may include physical components configured to exchange data with the storage device 30, e.g., include at least one transmitter TX and at least one receiver RX. The interconnect part 22 in the host 20 may include, e.g., four transmitters TX1 to TX4 and four receivers RX1 to RX4. The link layer of the interconnect part 22 may manage transmission and/or composition of data and manage the integrity and an error of data.

The storage device 30 may include an interconnect part 32, a storage controller 34, and a nonvolatile memory (NVM) 36. The storage controller 34 may control the NVM 36 in response to a write request from the host 20 so that data is written in the NVM 36, or control the NVM 36 in response to a read request from the host 20 so that data stored in the NVM 36 is read. The storage controller 34 may be include processing circuitry such as hardware including logic circuits; a hardware/software combination executing software; or a combination thereof. For example, the processing circuitry more specifically may include, but is not limited to, one or more of a central processing unit (CPU), a processor core, an arithmetic logic unit (ALU), a digital signal processor, a microcomputer, a field programmable gate array (FPGA), a programmable logic unit, a microprocessor, an application-specific integrated circuit (ASIC), etc.

The interconnect part 32 may provide the interface 40 between the storage device 30 and the host 20. For example, the interconnect part 32 may include a physical layer and a link layer. The physical layer of the interconnect part 32 may include physical components configured to exchange data with the storage device 30, e.g., include at least one transmitter TX and at least one receiver RX. The interconnect part 32 in the storage device 30 may include, e.g., four receivers RX1 to RX4 and four transmitters TX1 to TX4. The link layer of the interconnect part 32 may manage transmission and/or composition of data and manage the integrity and an error of data.

According to at least one example embodiment of the inventive concepts, when the storage system 10 is a mobile device, the physical layers of the interconnect parts 22 and 32 may be defined by an "M-PHY" specification, and the link layers thereof may be defined by a "UniPro" specification. M-PHY and UniPro are interface protocols proposed by the Mobile Industry Processor Interface (MIPI) Alliance. Each of the link layers of the interconnect parts 22 and 32 may include a physical adapted layer, and the physical adapted layer may control physical layers to manage a symbol of data and manage power.

Figure 2:
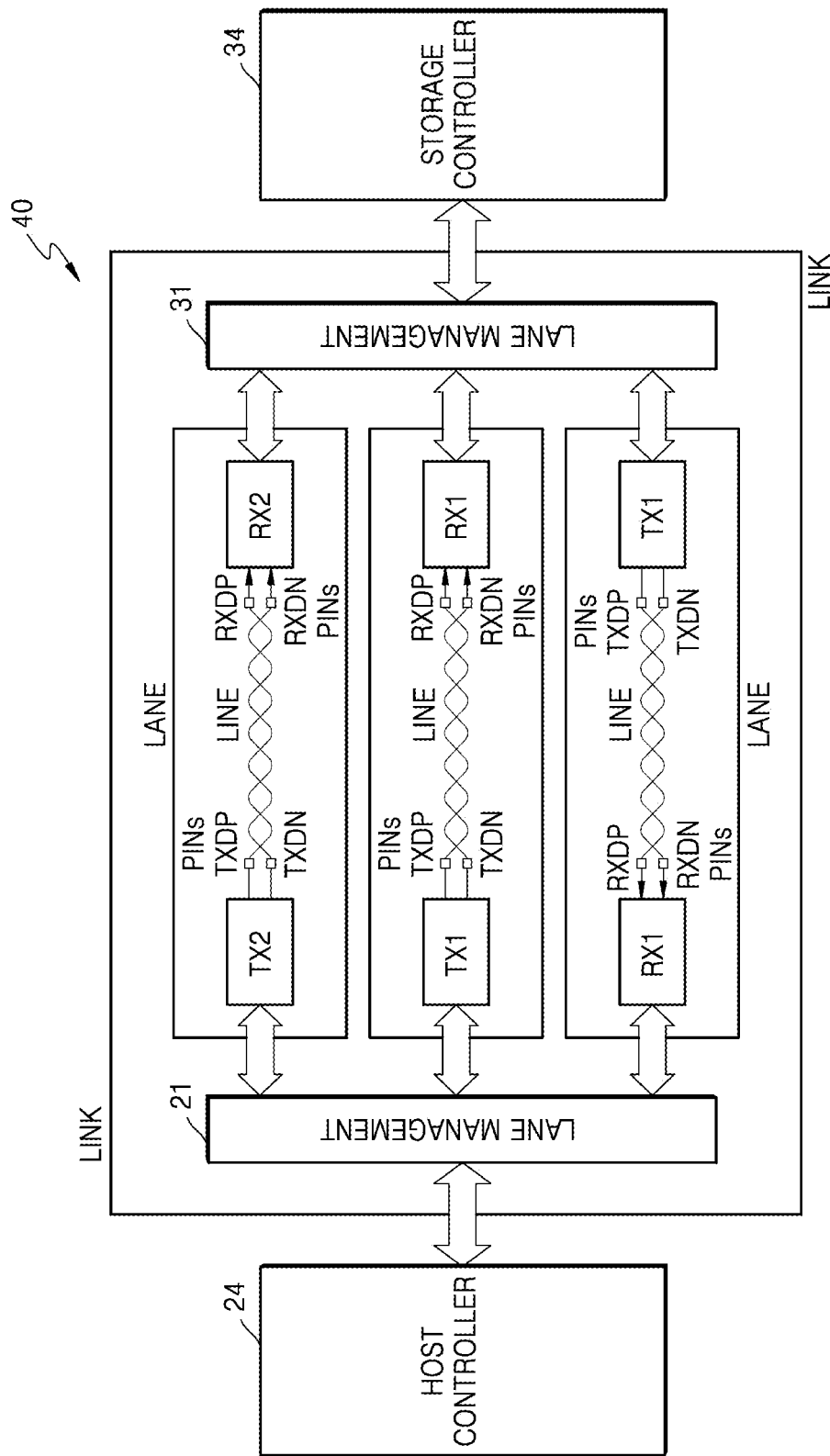
FIG. 2 is a diagram for describing an interface between a host and a storage device of FIG. 1.

A transmitter TX included in the interconnect part 22 in the host 20 and a receiver RX included in the interconnect part 32 in the storage device 30 may form one lane as shown in FIG. 2. In addition, a transmitter TX included in the interconnect part 32 in the storage device 30 and a receiver RX included in the interconnect part 22 in the host 20 may also form one lane. The present embodiment shows that the numbers of transmitters TX1 to TX4 and receivers RX1 to RX4 included in the interconnect part 22 in the host 20 are the same as the numbers of receivers RX1 to RX4 and transmitters TX1 to TX4 included in the interconnect part 32 in the storage device 30, respectively. According to example embodiments, the numbers of transmitters TX and receivers RX included in the interconnect part 22 in the host 20 may differ from the numbers of receivers RX and transmitters TX included in the interconnect part 32 in the storage device 30, respectively. In addition, the capability of the host 20 may differ from the capability of the storage device 30.

The host 20 and the storage device 30 may recognize a physically connected lane and perform processing for receiving information about a counterpart device, e.g., processing such as link startup. The host 20 and the storage device 30 may perform a link startup sequence (LSS) before exchanging data. By performing the LSS, the host 20 and the storage device 30 may mutually exchange and be aware of information about the numbers of transmitters TX and receivers RX, information about a physically connected lane, information about the capability of a counterpart device, and the like. After finishing the LSS, the host 20 and the storage device 30 may be set to a linkup state in which data is stably exchanged with each other.

The LSS may be performed during an initialization operation performed when the storage system 10 is first used or during a booting operation of the storage system 10. In addition, the LSS may be performed during a recovery operation for an error in the linkup state. Because the LSS requires exchanging a lot of information about the host 20 and the storage device 30, a long time may be taken to perform the LSS. Moreover, when the LSS is performed between the host 20 and the storage device 30 in a low speed (LS) mode, a longer time may be taken to perform a link startup operation. To reduce a link startup time, the host 20 may perform a link startup operation in a high speed (HS) mode. A link startup operation performed in an HS mode may also be referred to as an HS link startup operation.

In some instances, the host 20 may transmit an HS link startup message to the storage device 30 in order to initiate an HS link startup operation before the storage device 30 is ready to perform a link startup operation, and thus, the storage device 30 may not respond to the HS link startup message. Accordingly, the host 20 may perform a retry operation of retrying an HS link startup operation (e.g., by resending an HS link startup message) because a link startup reception response is not received from the storage device 30. Due to the retry operation of the host 20, a link startup time may be long. Accordingly, if the storage device 30 is able to transmit an HS link startup message after finishing an initialization operation, if this facility is possible, the storage device 30 may not wait for an HS link startup message from the host 20, and the host 20 may perform an HS link startup operation without a retry operation, and thus, a link startup time may be reduced.

The storage controller 34 may perform data communication through a connected transmission lane and a connected reception lane among a plurality of lanes included in the interconnect part 32. The storage controller 34 may perform a control so that an HS link up message is transmitted to the host 20, by issuing an activation period or an activation period and a line-reset period through the connected transmission lane. Accordingly, the storage device 30 may perform link startup with the host 20 in the HS mode.

The host controller 24 may perform a control so that data communication is performed through a connected transmission lane and a connected reception lane among a plurality of lanes included in the interconnect part 22. The host controller 24 may perform a control so that the host 20 performs an HS link startup operation, by receiving an activation period or an activation period and a line-reset period through the connected reception lane. Accordingly, the host 20 may perform a link startup operation with the storage device 30 in the HS mode. The host controller 24 may be include processing circuitry such as hardware including logic circuits; a hardware/software combination executing software; or a combination thereof. For example, the processing circuitry more specifically may include, but is not limited to, one or more of a central processing unit (CPU), a processor core, an arithmetic logic unit (ALU), a digital signal processor, a microcomputer, a field programmable gate array (FPGA), a programmable logic unit, a microprocessor, an application-specific integrated circuit (ASIC), etc.

The NVM 36 may include a plurality of memory cells, and the plurality of memory cells may be, for example, flash memory cells. According to at least one example embodiment of the inventive concepts, the plurality of memory cells may be NAND flash memory cells. However, at least some example embodiments of the inventive concepts are not limited thereto, and in another embodiment, the plurality of memory cells may be resistive memory cells such as resistive random access memory (ReRAM or RRAM) memory cells, phase change random access memory (PRAM) memory cells, or magnetic random access memory (MRAM) memory cells.

In some embodiments, the storage device 30 may be implemented by a dynamic random access memoryless (DRAMless) device, and the DRAMless device may indicate a device without including a DRAM cache. In this case, the storage controller 34 may not include a DRAM controller. For example, the storage device 30 may use a partial region of the NVM 36 as a buffer memory.

In some embodiments, the storage device 30 may be an internal memory embedded in an electronic device. For example, the storage device 30 may be an embedded UFS memory device, an embedded multi-media card (eMMC), or a solid state drive (SSD). However, at least some example embodiments of the inventive concepts are not limited thereto, and the storage device 30 may be an NVM (e.g., one time programmable read-only memory (OTPROM), programmable read-only memory (PROM), erasable and programmable read-only memory (EPROM), electrically erasable and programmable read-only memory (EEPROM), mask ROM, or flash ROM). In some embodiments, the storage device 30 may be an external memory detachably attached to an electronic device. For example, the storage device 30 may include at least one of a UFS memory card, a compact flash (CF) card, a secure digital (SD) card, a micro secure digital (Micro-SD) card, a mini secure digital (Mini-SD) card, an extreme digital (xD) card, and a memory stick.

The storage system 10 may be implemented by an electronic device, e.g., a personal computer (PC), a laptop computer, a mobile phone, a smartphone, a tablet PC, a personal digital assistant (PDA), an enterprise digital assistant (EDA), a digital still camera, a digital video camera, an audio device, a portable multimedia player (PMP), a personal navigation device or portable navigation device (PND), an MP3 player, a handheld game console, or an e-book. Alternatively, the storage system 10 may be implemented by various types of electronic devices, e.g., a wearable device such as a watch or a head-mounted display (HMD).

FIG. 2 is a diagram for describing the interface 40 between the host 20 and the storage device 30 of FIG. 1. The concepts of lane, line, and link in the interface 40 of FIG. 2 will be described. Hereinafter, for convenience of description, the transmitter TX1 in the interconnect part 32 in the storage device 30 and the receiver RX1 in the interconnect part 22 in the host 20 among the plurality of transmitters and receivers included in the interconnect parts 22 and 32 of FIG. 1 will be representatively described.

Referring to FIG. 2, the interface 40 may support a plurality of lanes. Each lane is a transmission channel carrying unidirectional single-signal information thereon. A lane may include the transmitter TX1, the receiver RX1, and a line point-to-point interconnecting between the transmitter TX1 and the receiver RX1. The transmitter TX1 or the receiver RX1 has one differential output or input line interface matched with two signaling pins. The pins are individually represented by DP denoting a positive node of a differential signal and DN denoting a negative node of the differential signal. A selective prefix TX or RX may be attached to each of the pins DP and DN to indicate a transmitter pin or a receiver pin. The line includes two differentially routed wires connecting the pins of the transmitter TX1 and the receiver RX1. These wires are transmission lines.

The interface 40 includes at least one lane in each direction. The numbers of lanes in respective directions do not have to be symmetrical. A link may include one or more lanes in each direction and lane management parts 21 and 31 configured to provide a bidirectional data transmission function. Although FIG. 2 shows that the lane management parts 21 and 31, the host controller 24, and the storage controller 34 are individually separated, at least some example embodiments of the inventive concepts are not limited thereto, and the lane management parts 21 and 31 may be respectively included in the host controller 24 and the storage controller 34.

Figure 3:
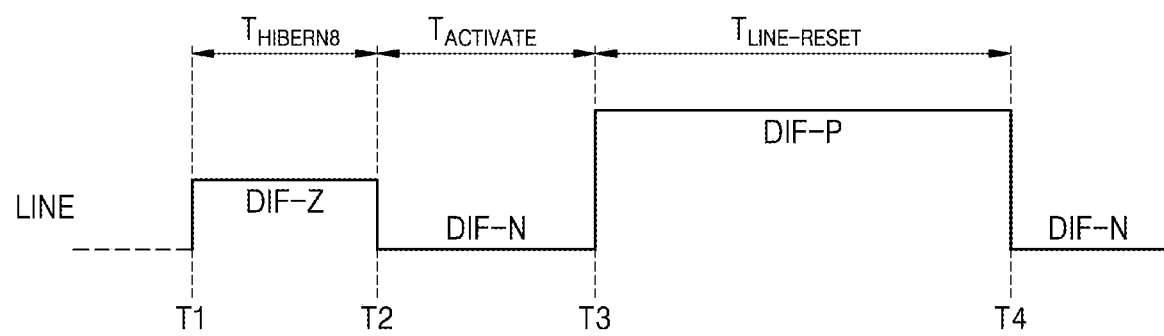
FIG. 3 is a timing diagram for describing states of a line of FIG. 2.

FIG. 3 is a timing diagram for describing states of a line of FIG. 2.

Referring to FIGS. 2 and 3, the line may have a DIF-Z state having an almost zero differential line voltage, a DIF-N state having a negative differential line voltage, or a DIF-P state having a positive differential line voltage. Alternatively, although not shown in FIG. 3, the line may have a DIF-Q state indicating a high impedance state or a DIF-X state, which is neither the DIF-N state nor the DIF-P state. Herein, a differential line voltage may be defined by a value obtained by subtracting a voltage of a line connected to a negative node from a voltage of a line connected to a positive node.

In the line between the transmitter TX1 and the receiver RX1, the receiver RX1 may maintain the line in the DIF-Z state while the transmitter TX1 is in a hibernation state (hereinafter, referred to as a "HIBERN8 state"), which is a power saving state of ultralow power. During the DIF-Z state from a time point T1 to a time point T2, the line is in the HIBERN8 state. A time between the time point T1 and the time point T2 is referred to as a hibernation period THIBERN8.

At the time point T2, the transmitter TX1 may transition the line to the DIF-N state to signal exit from the HIBERN8 state. In this case, the receiver RX1 may detect the DIF-N state of the line and be aware that the links of both the transmitter TX1 and the receiver RX1 will be ready to be used and both the transmitter TX1 and the receiver RX1 will exit from the HIBERN8 state. A time between the time point T2 and a time point T3, where the line is in the DIF-N state, is referred to as an activate period $T_{ACTIVATE}$. According to at least one example embodiment of the inventive concepts, a length of the activate period $T_{ACTIVATE}$ may be less than about 0.9 ms. In another embodiment, the length of the activate period $T_{ACTIVATE}$ may be less than about 1.6 ms.

For example, when the length of the activate period $T_{ACTIVATE}$ of the line is less than 0.9 ms, the transmitter TX1 and the receiver RX1 may enter an HS mode HS-MODE. When the length of the activate period $T_{ACTIVATE}$ of the line is 0.9 ms or more, the transmitter TX1 and the receiver RX1 may enter an LS mode LS-MODE. The LS mode LS-MODE may correspond to a pulse width modulation (PWM) mode.

At the time point T3, the transmitter TX1 may transition the line to the DIF-P state to signal a line reset operation. In this case, the receiver RX1 may detect the DIF-P state of the line and be aware that both the transmitter TX1 and the receiver RX1 will be ready for a line reset operation and perform the line reset operation. A time between the time point T3 and a time point T4, where the line is in the DIF-P state, is referred to as a line-reset period $T_{IME-RESET}$. According to at least one example embodiment of the inventive concepts, a length of the line-reset period $T_{LINE-RESET}$ may be about 3.1 ms or more.

Figure 4:
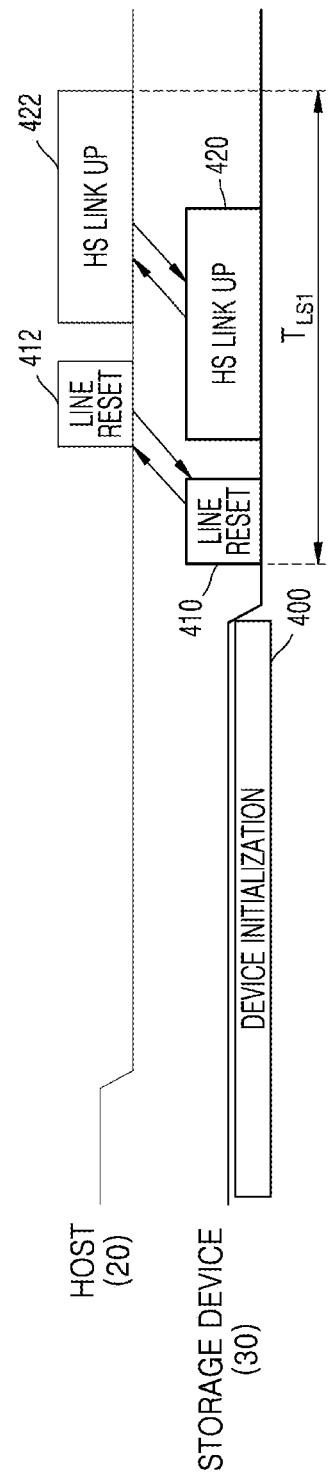
FIG. 4 is a diagram for describing a high speed link up operation by a storage device, according to at least some example embodiments of the inventive concepts.

FIG. 4 is a diagram for describing an HS link up operation by the storage device 30, according to at least some example embodiments of the inventive concepts;

Referring to FIG. 4, the storage device 30 may perform an initialization operation 400 when power-up according to booting of the storage system 10 is detected. The initialization operation 400 of the storage device 30 may include reading initialization information stored in the NVM 36 included in the storage device 30 and setting the read initialization information in a configuration register. For example, the initialization information may include protection information about whether to prohibit program/discard (e.g., storing or erasing of data of a nonvolatile memory), trimming data for trimming an operating voltage level in an operation mode, column repair information for repairing a failed bit line, information about a bad block including bad memory cells, and the like. The trimming data is data for configuring not only voltage adjustment in operation modes, e.g., a read operation, a program operation, and a discard operation, of the NVM 36 but also adjustment of a sense amplifier or a page buffer, optimization of a reference cell, and the like.

The storage device 30 may perform a line reset operation 410 after finishing the initialization operation 400. The line reset operation 410 may include resetting transmitters TX of connected lanes and transmitting, to the host 20, a line rest message that includes information indicating that the transmitters TX are reset. The host 20 may receive the line reset message sent from the storage device 30 and perform a line reset operation 412. The line reset operation 412 may include resetting receivers RX of the connected lanes, and transmitting, to the storage device 30, a line reset message that includes information indicating that the receivers RX are reset. The line reset operations 410 and 412 may include resetting or clearing, to default values, all attributes of physical layers of the interconnect parts 32 and 22. The storage device 30 and the host 20 may exchange line reset information with each other (e.g., via line reset messages).

The storage device 30 may perform the line reset operation 410 and then perform an HS link up operation 420 including transmitting an HS link up message to the host 20. The host 20 may receive the HS link up message sent by the storage device 30 and perform an HS operation 422 which includes performing, in the HS mode, an LSS including exchange of trigger events, capability information exchange, control frame exchange, and the like with the storage device 30. The LSS will be described below with reference to FIG. 12. As is illustrated in greater detail in FIG. 12, an LSS operation between the host 20 and the storage device 30 includes each of the host device 20 and the storage device 30 performing multiple operations including, for example, sending and receiving multiple messages (e.g., trigger events including primitives). In the present specification, a link up operation performed at host device 20 (e.g., HS link up operation 422) refers to a portion of an LSS between the storage device 30 and the host 20 that is performed by the host device 20, and a linkup operation performed by the storage device 30 (e.g., HS link up operation 420) refers to refers to a portion of an LSS between the storage device 30 and the host 20 that is performed by the storage device 30.

When an HS link up operation is performed by the storage device 30, a link startup time $T_{LS1}$ between the storage device 30 and the host 20 is represented from a start time point of the line reset operation 410 of the storage device 30 to an end time point of the HS link up operation 422 of the host 20. The link startup time $T_{LS1}$ by the storage device 30 may be relatively less than a link startup time $T_{LS2}$ by the host 20 in FIG. 5. Link up by the host 20 between the host 20 and the storage device 30 may require a relatively long time as shown in FIG. 5.

Figure 5:
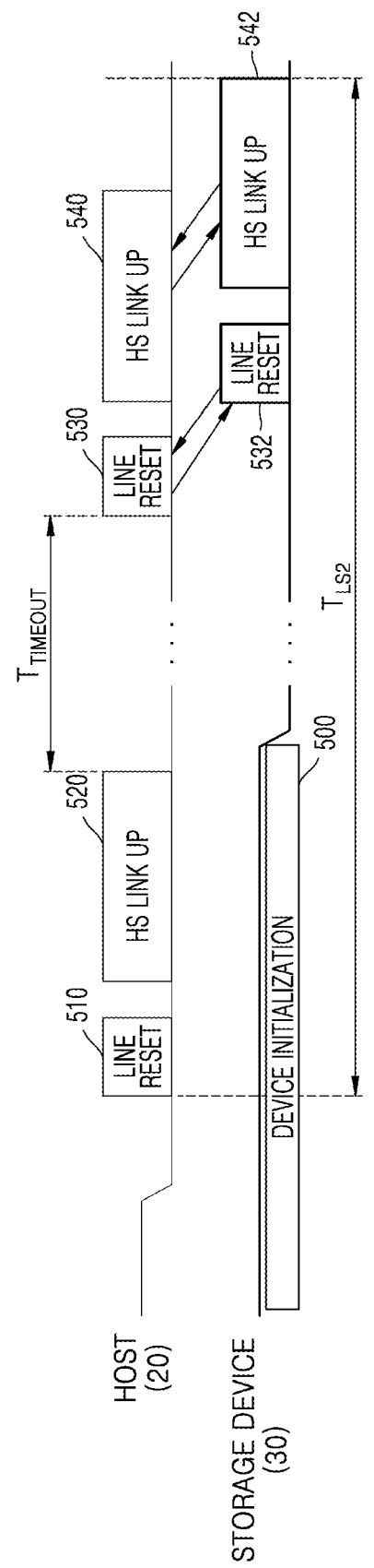
FIG. 5 is a diagram for describing a high speed link up operation by a host, as a comparative example of FIG. 4.

FIG. 5 is a diagram for describing HS link up by the host 20, as a comparative example of FIG. 4.

Referring to FIG. 5, the host 20 may perform a first line reset operation 510. The first line reset operation 510 may include resetting transmitters TX of connected lanes, and transmitting, to the storage device 30, a line reset message including information indicating that the transmitters TX are reset. After performing the line reset operation 510, the host 20 may perform a first HS link up operation 520. The first HS link up operation 520 may include transmitting an HS link up message to the storage device 30. The host 20 may transmit the first HS link up message and then expect to participate in an LSS with the storage device 30 in the HS mode. However, while the host 20 is transmitting the first line reset message and the first HS link up message to the storage device 30 during the first line reset operation 510 and the first HS link up operation 520, respectively, the storage device 30 may be performing an initialization operation 500. That is, the host 20 may perform the first line reset operation 510 and the first HS link up operation 520 in a state in which the host 20 is not aware of whether the storage device 30 has finished the initialization operation 500 and/or a state in which the storage device 30 is not ready to perform a link startup operation.

When a timeout period $T_{TIMEOUT}$ in which a link startup operation with the storage device 30 is not performed elapses after transmitting the first HS link up message during the first HS link up operation 520, the host 20 may perform a retry operation of transmitting second line reset message during a second line reset operation 530 and transmitting a second HS link up message during a second HS link up operation 540. The storage device 30 may receive the second line reset message and second HS link up message and perform, in the HS mode, an LSS including exchange of trigger events, capability information exchange, control frame exchange, and the like with the host 20.

When an HS link up operation by the host 20 is performed, the link startup time $T_{LS2}$ between the host 20 and the storage device 30 is represented from a start time point of the first line reset operation 510 of the host 20 to an end time point of the second HS link up operation 542 of the storage device 30. The link startup time $T_{LS2}$ by the host 20 may be relatively greater than the link startup time $T_{LS1}$ by the storage device 30 in FIG. 4.

Figure 6:
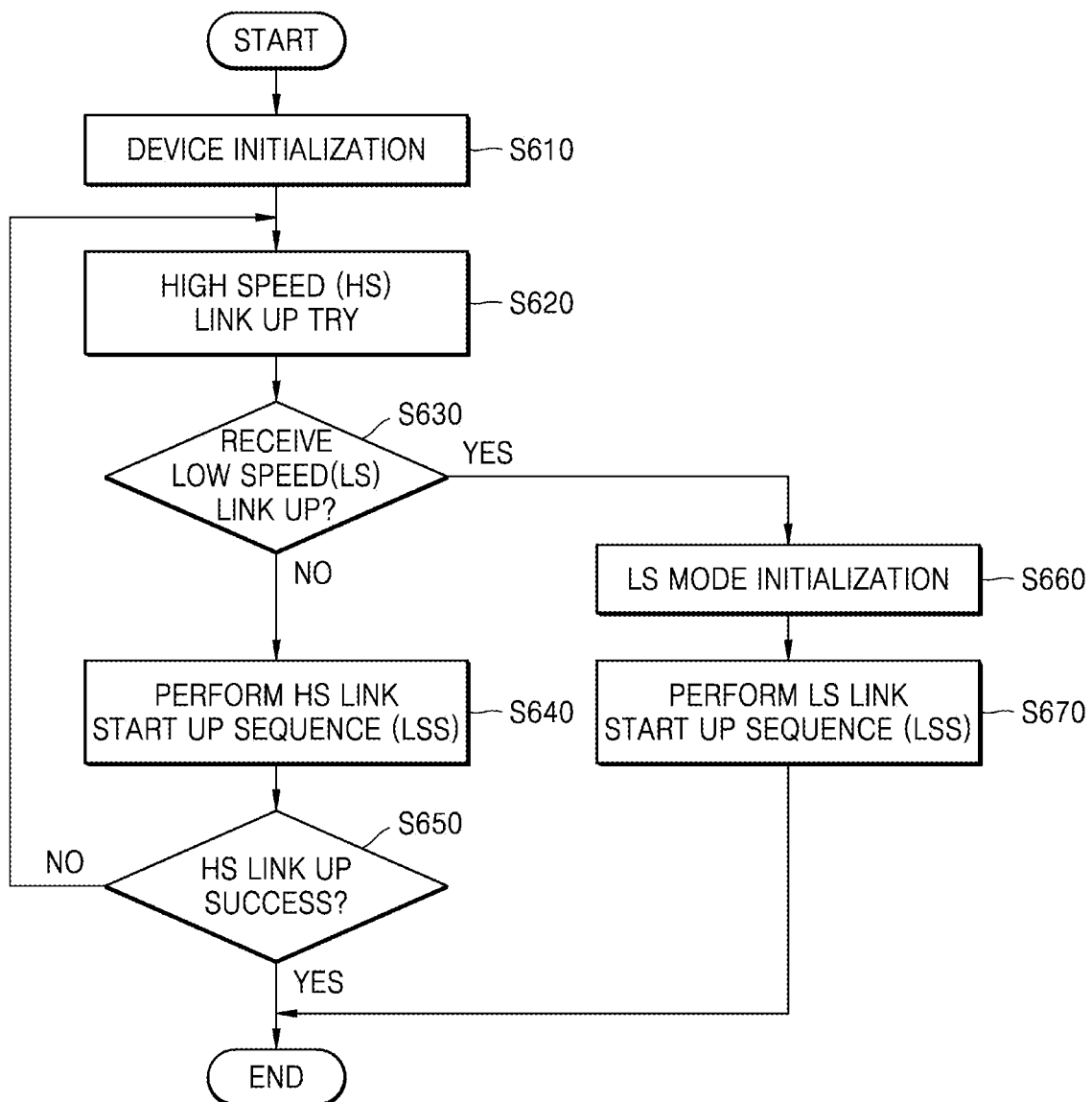
FIG. 6 is a flowchart of an operating method of a storage system, according to at least some example embodiments of the inventive concepts.

FIG. 6 is a flowchart of an operating method of a storage system, according to at least some example embodiments of the inventive concepts. With reference to FIG. 6, an operation of the storage device 30 in the storage system 10 of FIG. 1 is described.

Referring to FIGS. 1, 2, 3, and 6, in operation S610, the storage device 30 may perform an initialization operation when power-up according to booting of the storage system 10 is detected. In the initialization operation, the storage device 30 may read initialization information stored in the NVM 36 and set the read initialization information in a configuration register.

After performing the initialization information in operation S610, the storage device 30 may perform an HS link up operation which may include transmitting an HS link up message to the host 20 through a connected transmission lane in operation S620.

In operation S630, the storage device 30 may determine whether an LS link up message is received through a connected reception lane. The determining may include determining whether reception is performed in the activate period $T_{ACTIVATE}$ in which a line of the connected reception lane is in the DIF-N state from the DIF-Z state and in the line-reset period $T_{LINE-RESET}$ in which the line is in the DIF-P state and whether the length of the line-reset period $T_{LINE-RESET}$ is a first time or more. For example, the first time may be set to about 3.1 ms.

As a result of the determination in operation S630, when an LS link up message is received through the connected reception lane, the storage device 30 may proceed to operations S660 and S670. The storage device 30 may be initialized to an LS mode state in operation S660 and then perform an LSS in the LS mode in operation S670. Thereafter, the storage device 30 may be in an LS link up state with the host 20.

As a result of the determination in operation S630, when an LS link up message is not received through the connected reception lane, the storage device 30 may proceed to operations S640 and S650. In operation S640, the storage device 30 may perform an LSS with the host 20 in the HS mode. In operation S650, the storage device 30 may determine whether an HS link up state with the host 20 is successful (e.g., determine whether an HS mode LSS between the host 20 and the storage device 30 has been successfully initiated), and as a result of the determination, when the HS link up state with the host 20 is not successful, the storage device 30 may proceed to operation S620 to retry sending an HS link up message to the host 20.

In the present embodiment, in LS mode link startup performed in a PWM mode, when information required for the link startup is exchanged between the storage device 30 and the host 20 through a lane (a connected transmission lane or a connected reception lane), bits indicating the information required for the link startup may be represented by a pulse width of a signal to be transmitted through the lane. In the LS mode link startup in the PWM mode, a return to zero (RZ) scheme in which there is necessarily a logic low period between two logic high periods of a signal transmitted through a lane may be applied.

Unlike the LS mode link startup, in HS mode link startup, bits indicating information required for the link startup may be represented by a logic level of a signal to be transmitted through a lane. In the HS mode link startup, a non-return to zero (NRZ) scheme in which there does not have to be a logic low period between two periods even when logic high periods are continuous may be applied. Accordingly, an HS link startup operation may be performed at a higher speed than an LS link startup operation.

Figure 7:
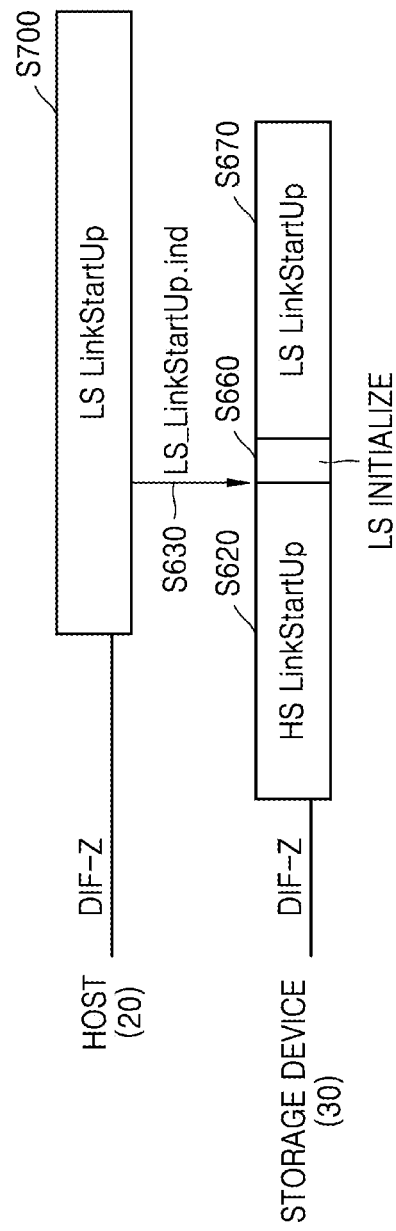
FIG. 7 is a diagram for describing an operating method of a storage system, according to at least some example embodiments of the inventive concepts.

FIG. 7 is a diagram for describing an operating method of a storage system, according to at least some example embodiments of the inventive concepts.

Referring to FIGS. 6 and 7, while the storage device 30 is performing an HS link up operation which includes transmitting an HS link startup message to the host 20 in an attempt to initiate an HS link up operation at the host 20 in operation S620, the host 20 may perform LS link up operation which includes sending an LS link up message to the storage device 30 through a connected transmission lane in operation S700. For example, as is illustrated in FIG. 7, while the storage device 30 is attempting to participate in an HS link startup operation (e.g., an HS mode LSS) with the host 20, the host 20 may be attempting to participate in an LS link startup operation (e.g., an LS mode LSS) with the storage device 30. In this case, the host 20 may perform an LS linkup operation including transmitting, to the storage device 30, an LS link up message including an LS link startup primitive LS_LinkStartUp.ind in an attempt to initiate an LS link up operation at the storage device 30 such that the host 20 and the storage device 30 can participate in an LS mode LSS together. The host 20 may transmit the LS link startup primitive LS_LinkStartUp.ind by carrying the LS link startup primitive LS_LinkStartUp.ind on a first trigger event TRG_UPR0 (FIG. 12) of an LSS The host 20 may transmit, through all transmission lanes, the first trigger event TRG_UPR0 including the LS link startup primitive LS_LinkStartUp.ind. The host 20 may continuously transmit the first trigger event TRG_UPR0 until lanes connected to the storage device 30, e.g., available reception lanes, receive the first trigger event TRG_UPR0. The LS link startup primitive LS_LinkStartUp.ind included in the first trigger event TRG_UPR0 transmitted from the host 20 may be received by the storage device 30 through a connected reception lane in operation S630.

The storage device 30 may receive the LS link startup primitive LS_LinkStartUp.ind of the host 20, which has a priority, be initialized to the LS mode state in operation S660, and perform the LSS in the LS mode in operation S670.

Figure 8:
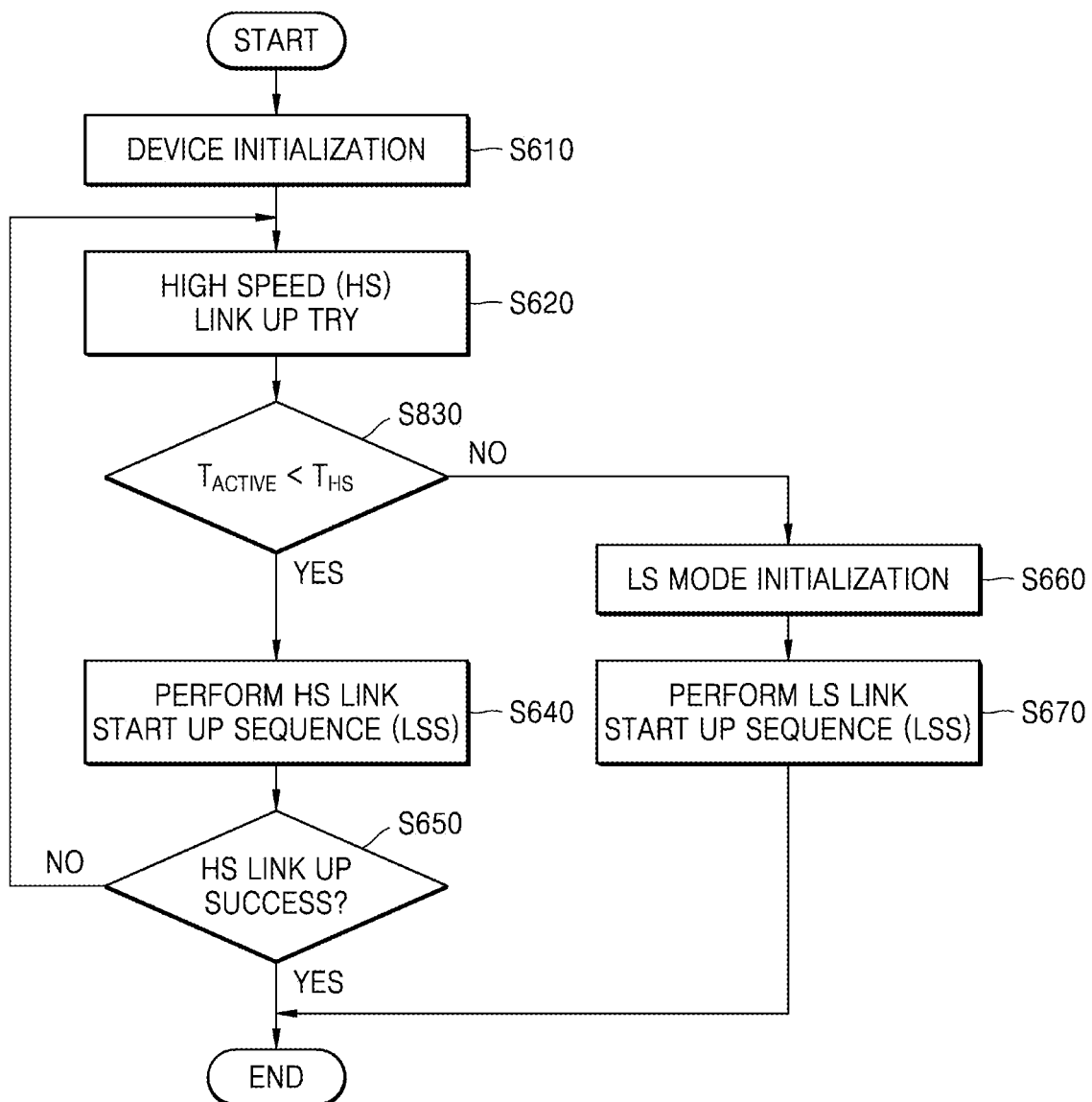
FIG. 8 is a flowchart of an operating method of a storage system, according to at least some example embodiments of the inventive concepts.

FIG. 8 is a flowchart of an operating method of a storage system, according to at least some example embodiments of the inventive concepts. With reference to FIG. 8, an operation of the storage device 30 in the storage system 10 of FIG. 1 is described.

Referring to FIG. 8, compared to FIG. 6, there is a difference in that the storage device 30 determines in operation S830 whether a length of the activate period $T_{ACTIVATE}$, in which a line of a connected lane is in the DIF-N state, is less than a second time $T_{HS}$. Hereinafter, a description made with reference to FIG. 6 is not repeated.

The line of the lane connected to the storage device 30 may not be in the DIF-N state, e.g., may be in the DIF-Z state, before operation S830. The second time $T_{HS}$ may be, for example, 0.9 ms. According to an example embodiment, the second time $T_{HS}$ may be set to be different from 0.9 ms. For example, the second time $T_{HS}$ may have a value less than 0.9 ms or have a value (e.g., 1.6 ms) greater than 0.9 ms.

As a result of the determination in operation S830, when the length of the activate period $T_{ACTIVATE}$ of the connected lane is the second time $T_{HS}$ or more, the storage device 30 may proceed to operations S660 and S670.

As a result of the determination in operation S830, when the length of the activate period $T_{ACTIVATE}$ of the connected lane is less than the second time $T_{HS}$, the storage device 30 may proceed to operations S640 and S650.

Figure 9:
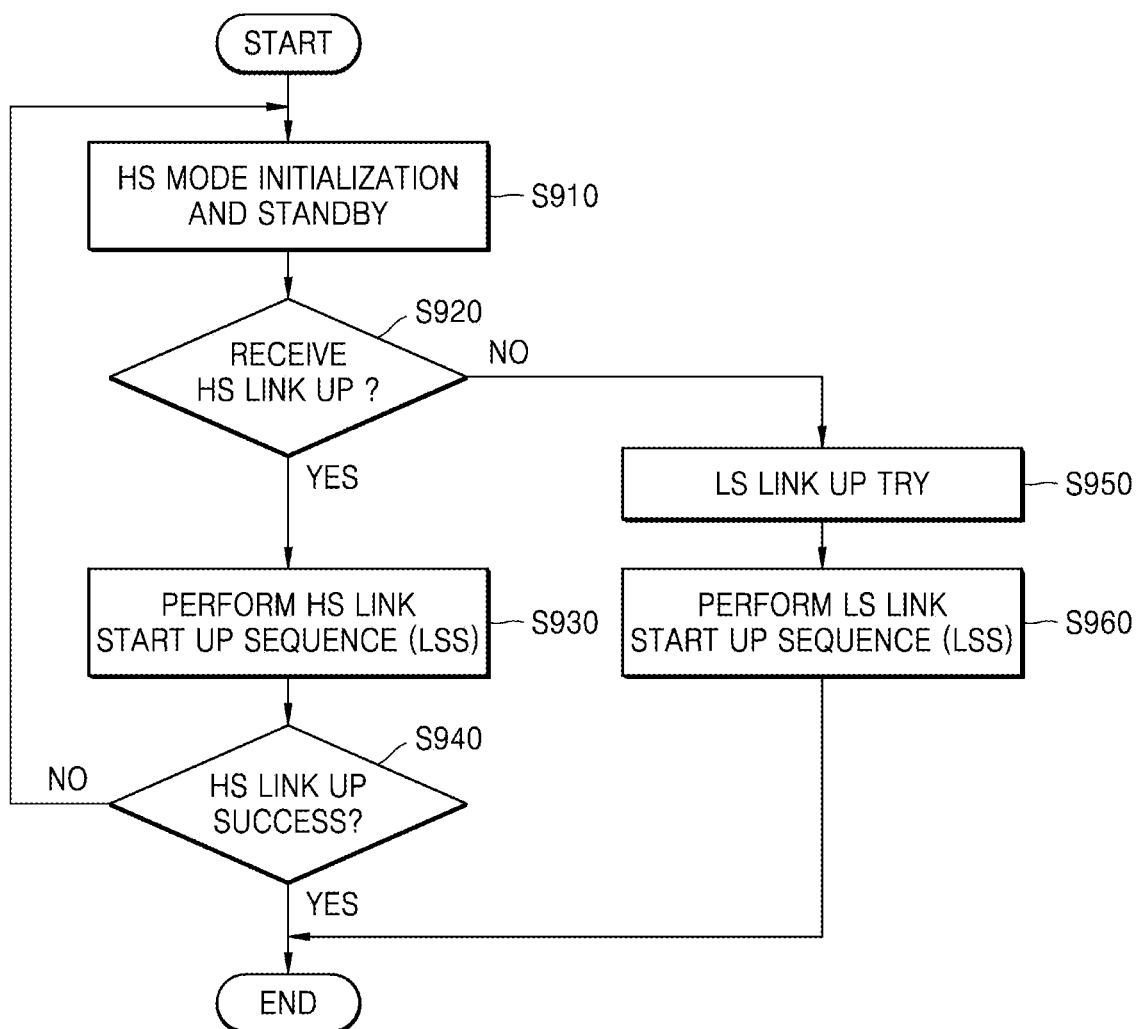
FIG. 9 is a flowchart of an operating method of a storage system, according to at least some example embodiments of the inventive concepts.

FIG. 9 is a flowchart of an operating method of a storage system, according to at least some example embodiments of the inventive concepts. With reference to FIG. 9, an operation of the host 20 in the storage system 10 of FIG. 1 is described.

Referring to FIGS. 1, 2, and 9, in operation S910, the host 20 may be initialized to an HS mode state and stand by. In operation S920, the host 20 may determine whether an HS link up message is received from the storage 30 through a connected reception lane. The determining may include determining whether reception is performed in the activate period $T_{ACTIVATE}$ in which a line of the connected reception lane is in the DIF-N state from the DIF-Z state and in the line-reset period $T_{LINE-RESET}$ in which the line is in the DIF-P state and whether the length of the line-reset period TUNE-RESET is the first time or more. For example, the first time may be set to about 3.1 ms.

As a result of the determination in operation S920, when an HS link up message is received through the connected reception lane, the host 20 may proceed to operations S930 and S940. In operation S930, the host 20 may perform an LSS with the storage device 30 in the HS mode. In operation S940, the host 20 may determine whether an HS link up state with the storage device 30 is successful (e.g., determine whether an HS mode LSS between the host 20 and the storage device 30 has been successfully initiated). As a result of the determination in operation S940, when the HS link up state with the storage device 30 is successful, the host 20 may be in the HS link up state with the storage device 30. As a result of the determination in operation S940, when the HS link up state with the storage device 30 is not successful, the host 20 may proceed to operation S910 to stand by in the HS mode state.

As a result of the determination in operation S920, when an HS link up message is not received through the connected reception lane, the host 20 may proceed to operations S950 and S960. The host 20 may try an LS link up operation which may include transmitting an LS link up message to the storage device 30 in operation S950 in an attempt to initiate an LS link up operation at the storage 30 such that the host 20 and the storage 30 can participate in an LS mode LSS together in operation S960. Thereafter, the host 20 may be in an LS link up state with the storage device 30.

Figure 10:
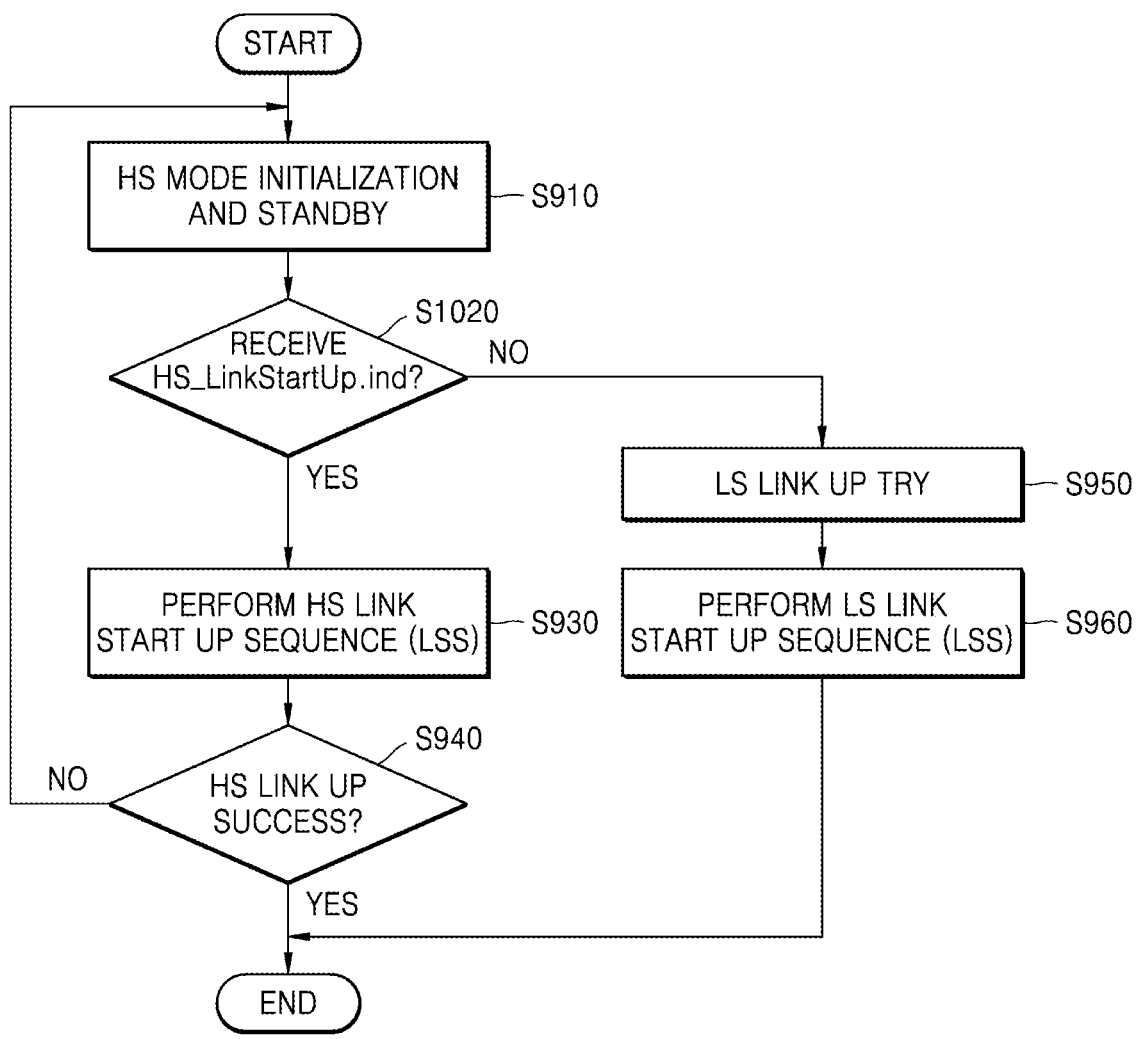
FIG. 10 is a flowchart of an operating method of a storage system, according to at least some example embodiments of the inventive concepts.

FIG. 10 is a flowchart of an operating method of a storage system, according to at least some example embodiments of the inventive concepts. With reference to FIG. 10, an operation of the host 20 in the storage system 10 of FIG. 1 is described.

Referring to FIG. 10, compared to FIG. 9, there is a difference in that the host 20 determines in operation S1020 whether an HS link startup primitive HS_LinkStartUp.ind is received through a connected lane. Hereinafter, a description made with reference to FIG. 9 is not repeated.

The host 20 may stand by in the HS mode state in operation S910 and determine in operation S1020 whether the HS link startup primitive HS_LinkStartUp.ind is received through the connected lane. The HS link startup primitive HS_LinkStartUp.ind may be transmitted from the storage device 30 to the host 20 and indicates that the host 20 is performing an HS link up operation and is attempting to initiate an HS link up operation at the storage 30 such that the host 20 and the storage 30 can participate in an HS mode LSS together.

As a result of the determination in operation S1020, when the HS link startup primitive HS_LinkStartUp.ind is received, the host 20 may be aware that the storage device 30 will try an HS link up operation. Thereafter, the host 20 may perform an LSS with the storage device 30 in the HS mode in operation S930.

As a result of the determination in operation S1020, when the HS link startup primitive HS_LinkStartUp.ind is not received, the host 20 may be aware that the storage device 30 has a product specification that may not include trying an HS link up operation. Thereafter, the host 20 may try an LS link up operation which may include transmitting an LS link up message to the storage device 30 in operation S950 in order to initiate the participation of the storage device 30 in an LSS in the LS mode in operation S960.

Figure 11:
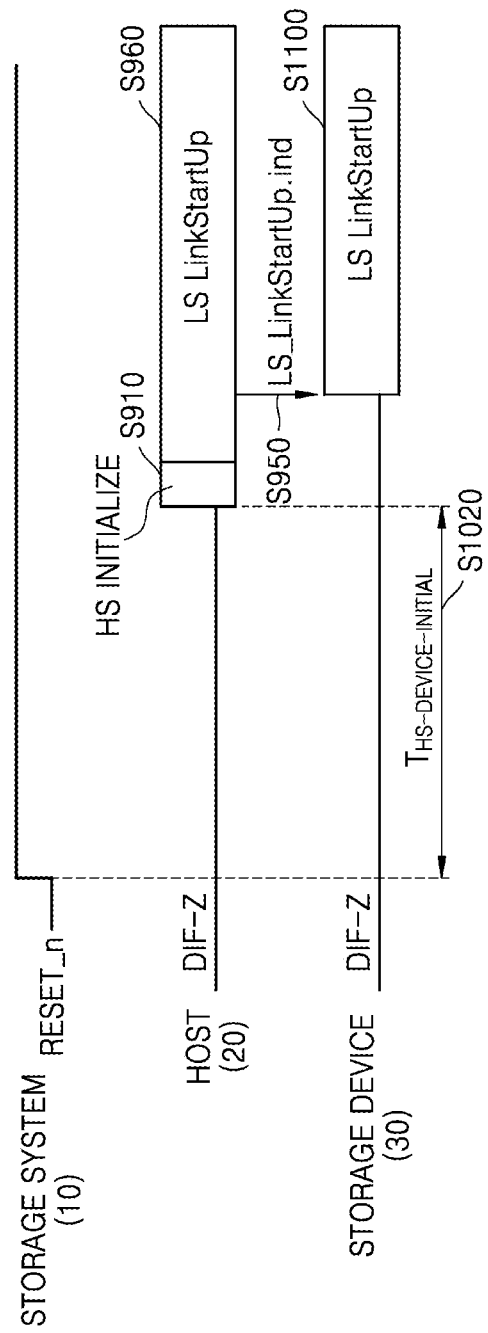
FIG. 11 is a diagram for describing an operating method of a storage system, according to at least some example embodiments of the inventive concepts.

FIG. 11 is a diagram for describing an operating method of a storage system, according to at least some example embodiments of the inventive concepts.

Referring to FIGS. 10 and 11, a reset signal RESET_n of active low is released in the storage system 10, and a line of a lane connected to the host 20 is in the HIBERN8 state of the DIF-Z state. In operation S910, the host 20 may exit from the HIBERN8 state, be initialized to the HS mode state, and stand by. In operation S1020, the host 20 may determine whether an HS link startup primitive HS_LinkStartUp.ind is received from the storage device 30 within a third time $T_{HS\text{-}DEVICE\text{-}INITIAL}$ from the release of the reset signal RESET_n. The third time $T_{HS\text{-}DEVICE\text{-}INITIAL}$ may be set to a time taken for the storage device 30 to be initialized to the HS mode state. That is, the storage device 30 may be initialized to the HS mode state within the third time $T_{HS\text{-}DEVICE\text{-}INITIAL}$ and try an HS link up operation. For example, the third time $T_{HS\text{-}DEVICE\text{-}INITIAL}$ may be set to about 10 ms.

The storage device 30 may transmit, through all transmission lanes, the first trigger event TRG_UPR0 including the HS link startup primitive HS_LinkStartUp.ind. The storage device 30 may continuously transmit the first trigger event TRG_UPR0 until lanes connected to the host 20, e.g., available reception lanes, receive the first trigger event TRG_UPR0. The HS link startup primitive HS_LinkStartUp.ind included in the first trigger event TRG_UPR0 transmitted from the storage device 30 may be received by the host 20 through a connected reception lane in operation S1020.

When the HS link startup primitive HS_LinkStartUp.ind is not received through connected lanes in operation S1020, the host 20 may try to perform a low speed (LS) link up operation by transmitting a LS link up message to the storage device 30 through all transmission lanes in operation S950. The LS link up message may include the first trigger event TRG_UPR0 which may include an LS link startup primitive LS_LinkStartUp.ind. The host 20 may continuously transmit the first trigger event TRG_UPR0 until lanes connected to the storage device 30, e.g., available reception lanes, receive the first trigger event TRG_UPR0.

The storage device 30 may receive the first trigger event TRG_UPR0 including the LS link startup primitive LS_LinkStartUp.ind and perform an LSS with the host 20 in the LS mode in operations S960 and S1100.

Figure 12:
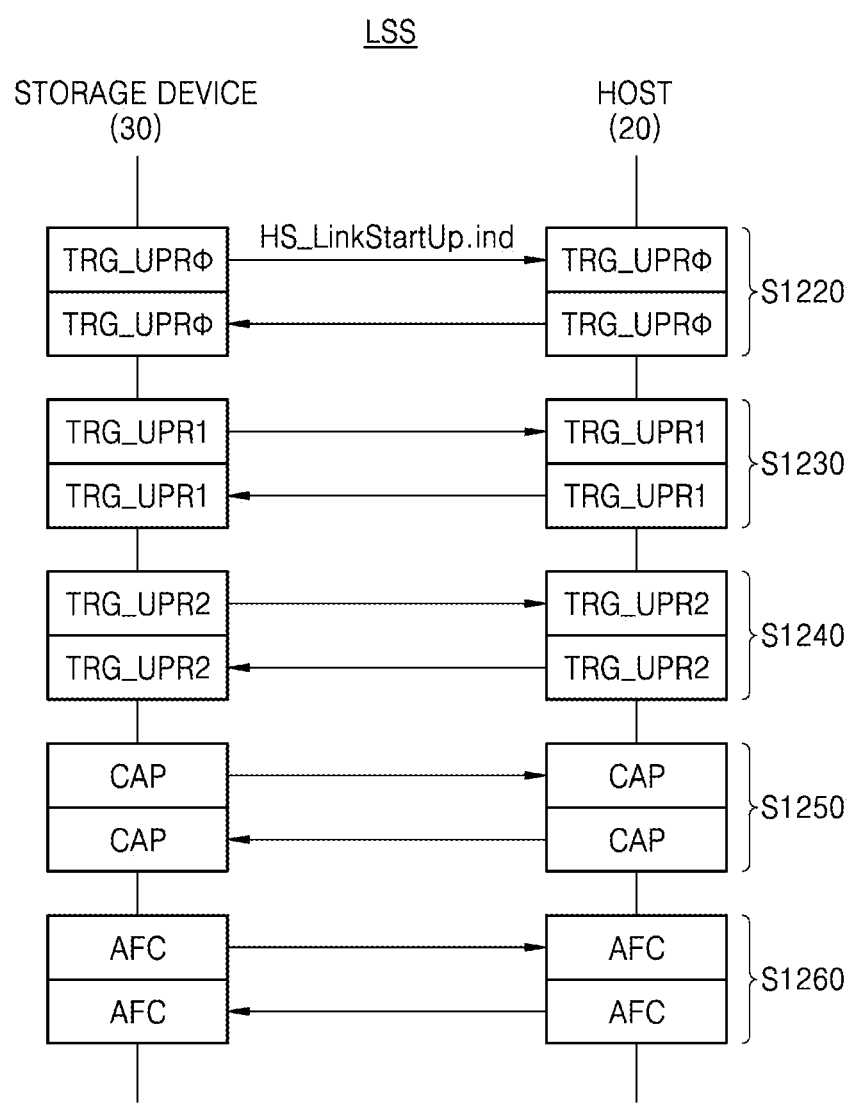
FIG. 12 is a signaling diagram for describing a link startup sequence according to at least some example embodiments of the inventive concepts.

FIG. 12 is a signaling diagram for describing an LSS according to at least some example embodiments of the inventive concepts. The LSS of FIG. 12 is performed in a multi-phase handshake mode in which connected lanes, e.g., available lanes, exchange UniPro trigger events for bidirectionally establishing initial link communication.

Referring to FIGS. 1, 2, and 12, in operation S1210, the storage device 30 may generate perform a line reset operation that includes resetting transmitters TX of connected lanes, and transmit a line reset message LINE-RESET that includes information indicating that the transmitters TX are reset. The host 20 may receive line reset message LINE-RESET sent from the storage device 30, perform a line reset operation that includes resetting receivers RX of the connected lanes, and transmit a line reset message LINE-RESET that includes information indicating that the receivers RX are reset. The line reset operations may include resetting or clearing, to default values, all attributes of physical layers of the interconnect parts 32 and 22. The storage device 30 and the host 20 may exchange line reset information with each other (e.g., via line reset messages). Operation S1210 may be referred to as a line reset phase. After performing the line reset phase S1210, the LSS may start.

The LSS may be defined by certain phases. The LSS may use a trigger event for each phase, and each trigger event may be transmitted several times.

In a first phase S1220 of the LSS, the LSS may discover connected lanes. To this end, the storage device 30 may transmit the first trigger event TRG_UPR0 through all transmission lanes. The storage device 30 may perform an HS link up operation that may include continuously transmitting the first trigger event TRG_UPR0 until lanes connected to the host 20, e.g., available reception lanes, receive the first trigger event TRG_UPR0. The first trigger event TRG_UPR0 transmitted from the storage device 30 may include a physical lane number of a transmission lane of the storage device 30, through which a corresponding trigger is to be transmitted. In addition, the first trigger event TRG_UPR0 transmitted from the storage device 30 may include an HS link startup primitive HS_LinkStartUp.ind to try and initiate the participation of the host 20 in the LSS.

Also, in the first phase S1220, the host 20 may transmit the first trigger event TRG_UPR0 through all transmission lanes. The host 20 may continuously transmit the first trigger event TRG_UPR0 until lanes connected to the storage device 30, e.g., available reception lanes, receive the first trigger event TRG_UPR0. The first trigger event TRG_UPR0 transmitted from the host 20 may include a physical lane number of a transmission lane of the host 20, through which a corresponding trigger is to be transmitted.

In a second phase S1230 of the LSS, the LSS may realign a data lane. To this end, the storage device 30 may transmit a second trigger event TRG_UPR1 through all the transmission lanes. The storage device 30 may continuously transmit the second trigger event TRG_UPR1 until lanes connected to the host 20, e.g., available reception lanes, receive the second trigger event TRG_UPR1. The second trigger event TRG_UPR1 transmitted from the storage device 30 may include information about connected transmission lanes of the storage device 30.

In addition, in the second phase S1230, the host 20 may transmit the second trigger event TRG_UPR1 through all transmission lanes. The host 20 may continuously transmit the second trigger event TRG_UPR1 until lanes connected to the storage device 30, e.g., available reception lanes, receive the second trigger event TRG_UPR1. The second trigger event TRG_UPR1 transmitted from the host 20 may include information about connected transmission lanes of the host 20.

In a third phase S1240 of the LSS, the LSS may reflect, on attributes of physical layers of the interconnect parts 32 and 22, how many connected lanes, e.g., available lanes, are between the storage device 30 and the host 20. To this end, the storage device 30 may transmit a third trigger event TRG_UPR2 through the connected transmission lanes, e.g., the available transmission lanes. The storage device 30 may continuously transmit the third trigger event TRG_UPR2 until reception lanes connected to the host 20, e.g., available reception lanes, receive the third trigger event TRG_UPR2. The third trigger event TRG_UPR2 transmitted from the storage device 30 may include logical lane numbers related to the connected transmission lanes of the storage device 30.

In addition, in the third phase S1240, the host 20 may transmit the third trigger event TRG_UPR2 through the connected transmission lanes, e.g., the available transmission lanes. The host 20 may continuously transmit the third trigger event TRG_UPR2 until reception lanes connected to the storage device 30, e.g., available reception lanes, receive the third trigger event TRG_UPR2. The third trigger event TRG_UPR2 transmitted from the host 20 may include logical lane numbers related to the connected transmission lanes of the host 20.

When the third phase S1240 of the LSS is performed, the storage device 30 and the host 20 may have matched logical lane numbers related to available lanes. At this time point, the storage device 30 and the host 20 may end the LSS and perform capability exchange.

In operation S1250, the storage device 30 and the host 20 may exchange information about a capability CAP of a counterpart device with each other and be aware of the exchanged information, to communicate architecture requirements of the interconnect parts 32 and 22. The architecture requirements of the interconnect parts 32 and 22 may include, for example, a bandwidth, timers, a speed gear, termination/untermination (e.g., resuming), and scrambling. Operation S1250 may be referred to as a capability exchange phase. When the capability exchange phase S1250 is performed, information about the capability CAP of a counterpart device is collected by the interconnect parts 32 and 22, and attributes of physical layers of the interconnect parts 32 and 22 may be set according to the collected capability information.

In operation S1260, the storage device 30 and the host 20 may exchange a control frame AFC with each other to provide a reliable data link. To this end, the storage device 30 and the host 20 may send an initial data frame to a counterpart device, and a device, which has received the data frame, may send back the control frame AFC to a device, which has transmitted the data frame. The control frame AFC may be configured to be different from the data frame and may be used to allow a transmission device to be aware of clear reception, and used to inform the transmission device of a buffer space of an available data link layer.

Figure 13:
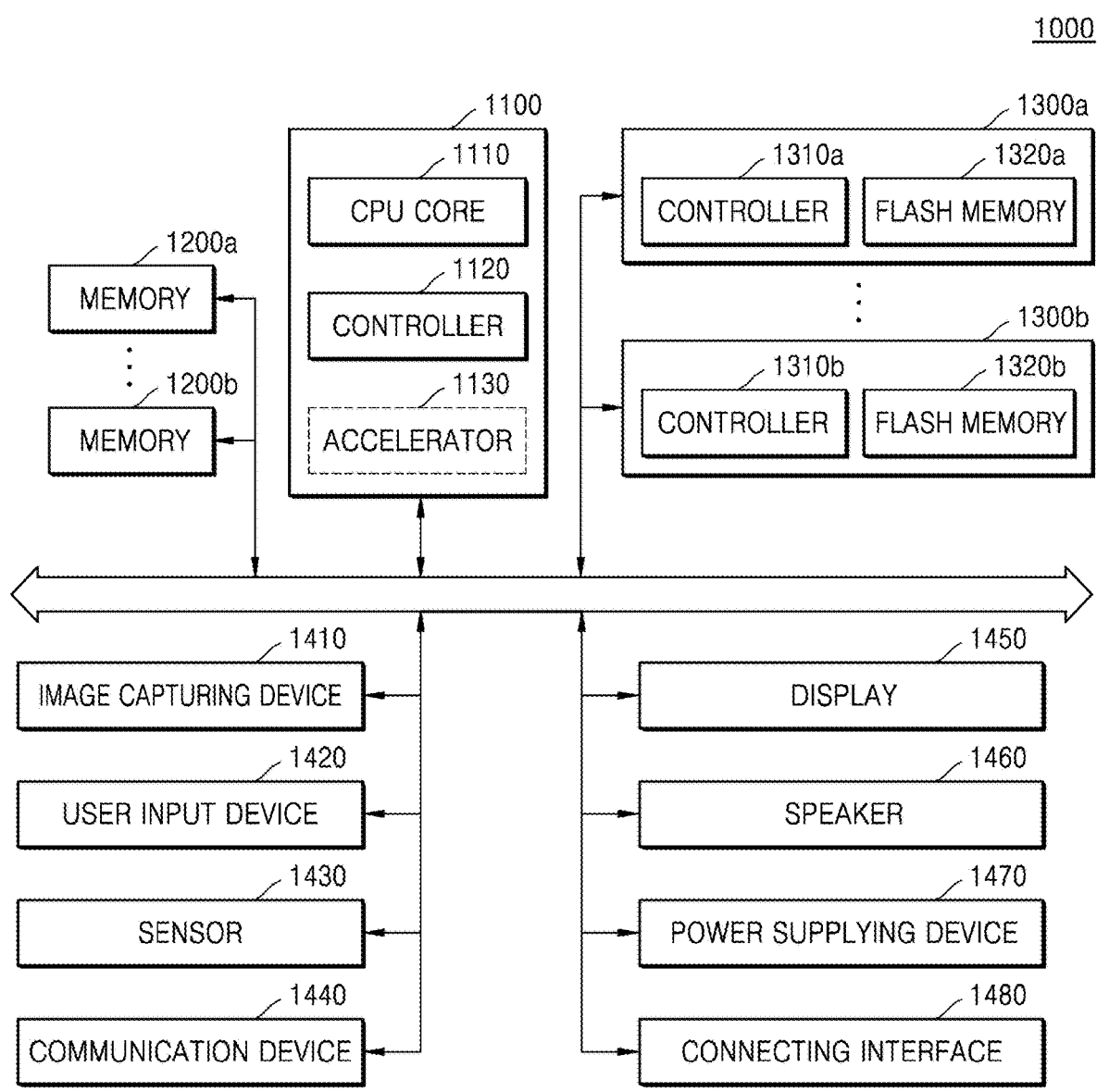
FIG. 13 is a block diagram of a system to which a storage device according to at least one example embodiment of the inventive concepts is applied.

FIG. 13 is a block diagram of a system 1000 to which a storage device according to at least one example embodiment of the inventive concepts is applied. The system 1000 of FIG. 13 may be basically a mobile system such as a portable communication terminal (a mobile phone), a smartphone, a tablet PC, a wearable device, a healthcare device, or an Internet of Things (IoT) device. However, the system 1000 of FIG. 13 is not necessarily limited to a mobile system and may be a PC, a laptop computer, a server, a media player, or an automotive device such as a navigation device. Hereinafter, subscripts (e.g., a in 1200a and a in 1300a) attached to reference numerals are to discriminate a plurality of circuits configured to perform the same facility.

Referring to FIG. 13, the system 1000 may include a main processor 1100, memories 1200a and 1200b, and storage devices 1300a and 1300b and may further include one or more of an image capturing device 1410, a user input device 1420, a sensor 1430, a communication device 1440, a display 1450, a speaker 1460, a power supplying device 1470, and a connecting interface 1480.

The main processor 1100 may control a general operation of the system 1000, and more particularly, control operations of the other components included in the system 1000. The main processor 1100 may be implemented by a general-purpose processor, an exclusive processor, an AP, or the like.

The main processor 1100 may include one or more CPU cores 1110 and may further include a controller 1120 configured to control the memories 1200a and 1200b and/or the storage devices 1300a and 1300b. According to an embodiment, the main processor 1100 may further include an accelerator block 1130 that is an exclusive circuit configured to perform HS data calculation such as artificial intelligence (AI) data calculation. The accelerator block 1130 may include a graphics processing unit (GPU), a neural processing unit (NPU), a data processing unit (DPU), and/or the like and may be implemented by a separate chip physically independent to the other components in the main processor 1100.

The memories 1200a and 1200b may be used as a main memory device of the system 1000 and may include a volatile memory such as static random access memory (SRAM) and/or DRAM or include an NVM such as flash memory, PRAM, and/or RRAM. The memories 1200a and 1200b may be implemented in the same package as the main processor 1100.

The storage devices 1300a and 1300b may function as a nonvolatile storage device storing data regardless of whether power is supplied thereto and may have a relatively larger storage capacity than the memories 1200a and 1200b. The storage devices 1300a and 1300b may include storage controllers 1310a and 1310b and NVM storages 1320a and 1320b storing data under control of the storage controllers 1310a and 1310b, respectively. The NVM storages 1320a and 1320b may include V-NAND flash memory of a two-dimensional (2D) or three-dimensional (3D) structure or another type of NVM such as PRAM and/or RRAM.

The storage devices 1300a and 1300b may be included in the system 1000 physically separated from the main processor 1100 or be implemented in the same package as the main processor 1100. In addition, the storage devices 1300a and 1300b may have a shape such as a memory card shape to be detachably coupled to the other components in the system 1000 through an interface such as the connecting interface 1480 to be described below. The storage devices 1300*a* and 1300*b* may be devices to which a standard protocol such as a UFS protocol is applied, but are not necessarily limited thereto.

The image capturing device 1410 may capture a still image or a moving picture and may include a camera, a camcorder, a webcam, and/or the like.

The user input device 1420 may receive various types of data from a user of the system 1000 and may include a touch pad, a keypad, a keyboard, a mouse, a microphone, and/or the like.

The sensor 1430 may sense various types of physical quantities, which may be obtained from the outside, and convert the sensed physical quantity into an electrical signal. The sensor 1430 may include a temperature sensor, a pressure sensor, an illumination sensor, a position sensor, an acceleration sensor, a biosensor, a gyroscope, and/or the like.

The communication device 1440 may perform signal transmission and reception between the system 1000 and other devices outside the system 1000 according to various communication protocols. The communication device 1440 may be implemented using an antenna, a transceiver, a modem, and/or the like.

The display 1450 and the speaker 1460 may function as output devices configured to output visual information and auditory information to the user of the system 1000, respectively.

The power supplying device 1470 may properly convert power supplied from a battery (not shown) in the system 1000 and/or an external power source and supply the converted power to each component in the system 1000.

The connecting interface 1480 may provide a connection between the system 1000 and an external device connected to the system 1000 to transmit and receive data to and from the system 1000. The connecting interface 1480 may be implemented by various interface schemes such as an advanced technology attachment (ATA) interface, a serial ATA (SATA) interface, an external SATA (e-SATA) interface, a small computer small interface (SCSI), a serial attached SCSI (SAS), a peripheral component interconnection (PCI) interface, a PCI express (PCIe) interface, an NVM express (NVMe) interface, an Institute of Electrical and Electronics Engineers (IEEE) 1394 interface, a universal serial bus (USB) interface, a secure digital (SD) card interface, a multi-media card (MMC) interface, an embedded MMC (eMMC) interface, a UFS interface, an embedded UFS (eUFS) interface, and a compact flash (CF) card interface.

Figure 14:
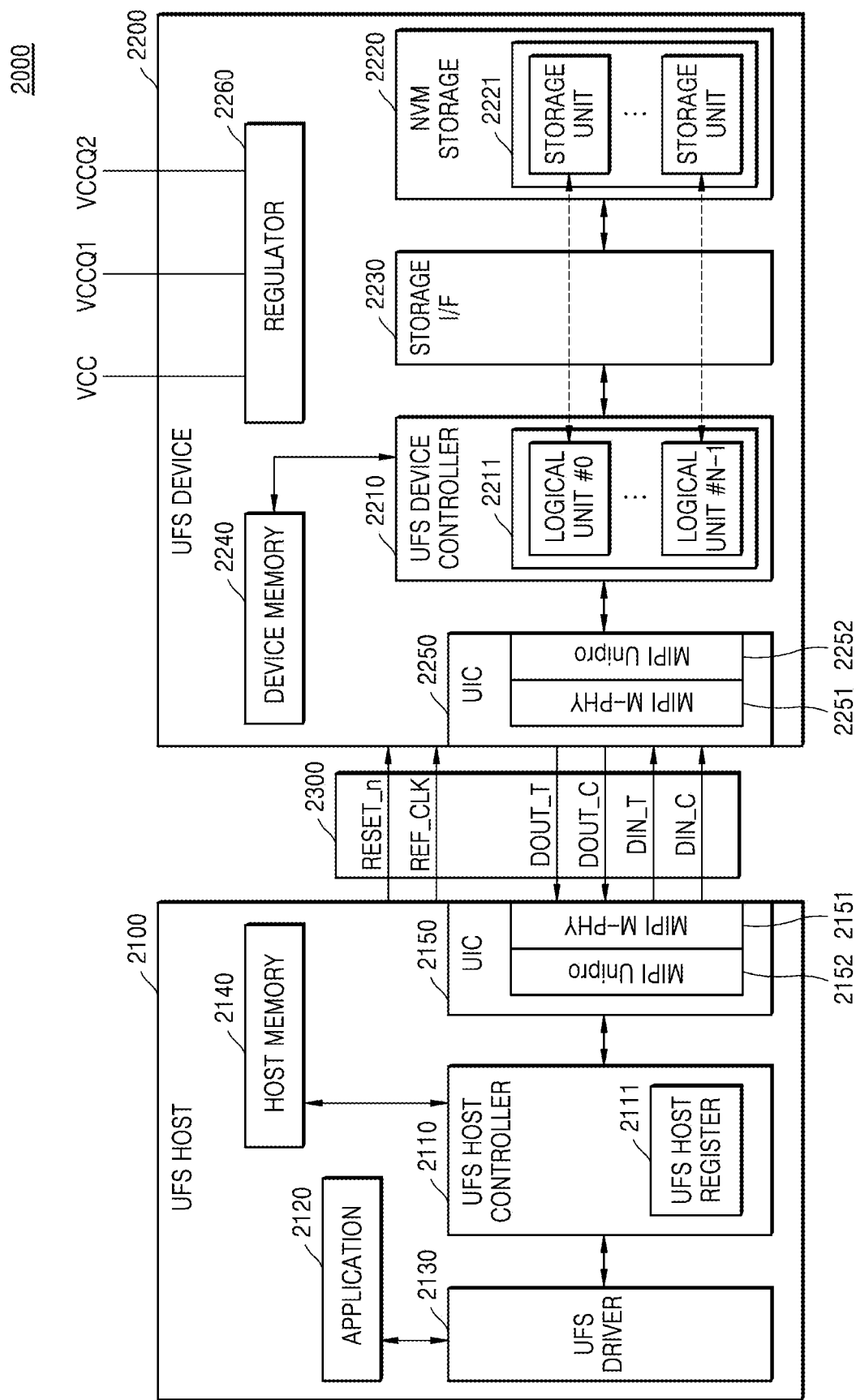
FIG. 14 is a block diagram of a universal flash storage (UFS) system according to at least one example embodiment of the inventive concepts.

FIG. 14 is a block diagram of a UFS system 2000 according to at least one example embodiment of the inventive concepts. The UFS system 2000 is a system conforming to a UFS standard issued by the Joint Electron Device Engineering Council (JEDEC) and may include a UFS host 2100, a UFS device 2200, and a UFS interface 2300. The above description of the system 1000 of FIG. 13 may also be applied to the UFS system 2000 of FIG. 14 within a range, which does not conflict with a description made below with reference to FIG. 14.

Referring to FIG. 14, the UFS host 2100 and the UFS device 2200 may be connected to each other through the UFS interface 2300. When the main processor 1100 of FIG. 13 is an AP, the UFS host 2100 may be implemented as a part of the AP. A UFS host controller 2110 and a host memory 2140 may correspond to the controller 1120 in the main processor 1100 and the memories 1200*a* and 1200*b* of FIG. 13, respectively. The UFS device 2200 may correspond to the storage devices 1300*a* and 1300*b* of FIG. 13, and a UFS device controller 2210 and an NVM storage 2220 may correspond to the storage controllers 1310*a* and 1310*b* and the NVM storages 1320*a* and 1320*b* of FIG. 13, respectively.

The UFS host 2100 may include the UFS host controller 2110, an application 2120, a UFS driver 2130, the host memory 2140, and a UFS interconnect (UIC) layer 2150. The UFS device 2200 may include the UFS device controller 2210, the NVM storage 2220, a storage interface 2230, a device memory 2240, a UIC layer 2250, and a regulator 2260. The NVM storage 2220 may include a plurality of storage units 2221, and the storage unit 2221 may include a V-NAND flash memory of a 2D or 3D structure or another type of NVM such as PRAM and/or RRAM. The UFS device controller 2210 and the NVM storage 2220 may be connected to each other through the storage interface 2230. The storage interface 2230 may be implemented to conform to a standard protocol such as a toggle or open NAND flash interface (ONFI) protocol.

The application 2120 may indicate a program, which desires to communicate with the UFS device 2200 to use a facility of the UFS device 2200. The application 2120 may transmit an input-output request (IOR) to the UFS driver 2130 for an input to or an output from the UFS device 2200. The IOR may indicate a data read request, a data write request, a data discard request, and/or the like but is not necessarily limited thereto.

The UFS driver 2130 may manage the UFS host controller 2110 through a UFS-host controller interface (HCI). The UFS driver 2130 may translate an IOR generated by the application 2120 into a UFS command defined by a UFS standard and transmit the translated UFS command to the UFS host controller 2110. One IOR may be translated into a plurality of UFS commands. A UFS command may be basically a command defined by a SCSI standard but may be a UFS standard exclusive command.

The UFS host controller 2110 may transmit the UFS command translated by the UFS driver 2130 to the UIC layer 2250 in the UFS device 2200 through the UIC layer 2150 and the UFS interface 2300. In this process, a UFS host register 2111 in the UFS host controller 2110 may act as a command queue (CQ).

The UIC layer 2150 in the UFS host 2100 may include a MIPI M-PHY 2151 and a MIPI UniPro 2152, and the UIC layer 2250 in the UFS device 2200 may also include a MIPI M-PHY 2251 and a MIPI UniPro 2252.

The UFS interface 2300 may include a line through which a reference clock signal REF_CLK is transmitted, a line through which a hardware reset signal RESET_n for the UFS device 2200 is transmitted, a pair of lines through which a differential input signal pair DIN_T and DIN_C is transmitted, and a pair of lines through which a differential output signal pair DOUT_T and DOUT_C is transmitted.

A frequency value of the reference clock signal REF_CLK provided from the UFS host 2100 to the UFS device 2200 may be one of four values, e.g., 19.2 MHz, 26 MHz, 38.4 MHz, and 52 MHz, but is not necessarily limited thereto. The UFS host 2100 may change the frequency value of the reference clock signal REF_CLK even during an operation, e.g., even while data is being transmitted and received between the UFS host 2100 and the UFS device 2200. The UFS device 2200 may generate clock signals of various frequencies from the reference clock signal REF_CLK received from the UFS host 2100, by using a phase-locked loop (PLL) or the like. In addition, the UFS host 2100 may set a value of a data rate between the UFS host 2100 and the UFS device 2200 based on the frequency value of the reference clock signal REF_CLK. That is, the value of the data rate may be determined depending on the frequency value of the reference clock signal REF_CLK.

The UFS interface 2300 may support multiple lanes, and each lane may be implemented by a differential pair. For example, the UFS interface 2300 may include one or more reception lanes and one or more transmission lanes. In FIG. 14, the pair of lines through which the differential input signal pair DIN_T and DIN_C is transmitted may form a reception lane, and the pair of lines through which the differential output signal pair DOUT_T and DOUT_C is transmitted may form a transmission lane. Although FIG. 14 shows one transmission lane and one reception lane, the number of transmission lanes and the number of reception lanes may vary.

The reception lane and the transmission lane may transmit data in a serial communication scheme, and full-duplex communication between the UFS host 2100 and the UFS device 2200 may be performed by a structure in which the reception lane is separated from the transmission lane. That is, the UFS device 2200 may transmit data to the UFS host 2100 through the transmission lane even while receiving data from the UFS host 2100 through the reception lane. In addition, control data such as a command from the UFS host 2100 to the UFS device 2200 and user data to be stored in or read from the NVM storage 2220 in the UFS device 2200 may be transmitted through the same lane. Accordingly, a separate lane for data transmission does not have to be further provided between the UFS host 2100 and the UFS device 2200 besides the reception lane and the transmission lane.

The UFS device controller 2210 in the UFS device 2200 may generally control an operation of the UFS device 2200. The UFS device controller 2210 may manage the NVM storage 2220 through logical units (LUs) 2211, which are logical data storage units. The number of LUs 2211 may be 8 but is not limited thereto. The UFS device controller 2210 may include a flash translation layer (FTL) and may translate a logical data address, e.g., a logical block address (LBA), transmitted from the UFS host 2100 into a physical data address, e.g., a physical block address (PBA), by using address mapping information of the FTL. A logical block for storage of user data in the UFS system 2000 may have a size of a certain range. For example, according to at least some example embodiments of the inventive concepts, a minimum size of the logical block may be set to 4 Kbytes.

When a command from the UFS host 2100 is input to the UFS device 2200 through the UIC layer 2250, the UFS device controller 2210 may perform an operation according to the input command and transmit, when the operation is completed, a completion response to the UFS host 2100.

For example, when the UFS host 2100 desires to store user data in the UFS device 2200, the UFS host 2100 may transmit a data write command to the UFS device 2200. When a ready-to-transfer response indicating ready to receive the user data is received from the UFS device 2200, the UFS host 2100 may transmit the user data to the UFS device 2200. The UFS device controller 2210 may temporarily store the received user data in the device memory 2240 and store the user data, temporarily stored in the device memory 2240, in a selected location of the NVM storage 2220 based on the address mapping information of the FTL.

As another example, when the UFS host 2100 desires to read user data stored in the UFS device 2200, the UFS host 2100 may transmit a data read command to the UFS device 2200. The UFS device controller 2210, which has received the data read command, may read the user data from the NVM storage 2220 based on the data read command and temporarily store the read user data in the device memory 2240. In this read process, the UFS device controller 2210 may detect an error of the read user data and correct the detected error, by using an embedded error correction code (ECC) circuit (not shown). Thereafter, the UFS device controller 2210 may transmit the user data, temporarily stored in the device memory 2240, to the UFS host 2100. In addition, the UFS device controller 2210 may further include an advanced encryption standard (AES) circuit (not shown), and the AES circuit may encrypt or decrypt data, input to the UFS device controller 2210, by using a symmetric-key algorithm.

The UFS host 2100 may sequentially store commands, to be transmitted to the UFS device 2200, in the UFS host register 2111, which may function as a CQ, and transmit the commands to the UFS device 2200 in the storage sequence. In this case, even when a previously transmitted command is being processed by the UFS device 2200, e.g., even when a notification indicating that the previously transmitted command is completely processed by the UFS device 2200 is not received, the UFS host 2100 may transmit a subsequent command buffered in the CQ to the UFS device 2200, and accordingly, the UFS device 2200 may also receive the subsequent command from the UFS host 2100 even while processing the previously transmitted command. According to at least some example embodiments of the inventive concepts, a maximum number (queue depth) of commands, which may be stored in the CQ, may be, for example, 32. In addition, the CQ may be implemented in a circular queue type in which a start point and an end point of a command string stored in the CQ are respectively indicated by a head pointer and a tail pointer.

Each of the plurality of storage units 2221 may include a memory cell array and a control circuit configured to control an operation of the memory cell array. The memory cell array may include a 2D or 3D memory cell array. The memory cell array may include a plurality of memory cells, and each memory cell may be a single level cell (SLC) in which one-bit information is stored or a cell in which two-or-more-bit information is stored, such as a multi-level cell (MLC), a triple level cell (TLC), or a quadruple level cell (QLC). The 3D memory cell array may include a V-NAND string vertically oriented so that at least one memory cell is located on another memory cell.

Power source voltages such as VCC, VCCQ1, and VCCQ2 may be input to the UFS device 2200. VCC is a main power source voltage for the UFS device 2200 and may have a value of about 2.4 V to about 3.6 V. VCCQ1 is a power source voltage for supplying a low-level voltage, is mainly for the UFS device controller 2210, and may have a value of about 1.14 V to about 1.26 V. VCCQ2 is a power source voltage for supplying a voltage of a level lower than VCC but higher than VCCQ1, is mainly for an input-output interface such as the MIPI M-PHY 2251, and may have a value of about 1.7 V to about 1.95 V. The power source voltages may be supplied to each component in the UFS device 2200 through the regulator 2260. The regulator 2260 may be implemented by a set of unit regulators respectively connected to the power source voltages described above.

Figure 15A:
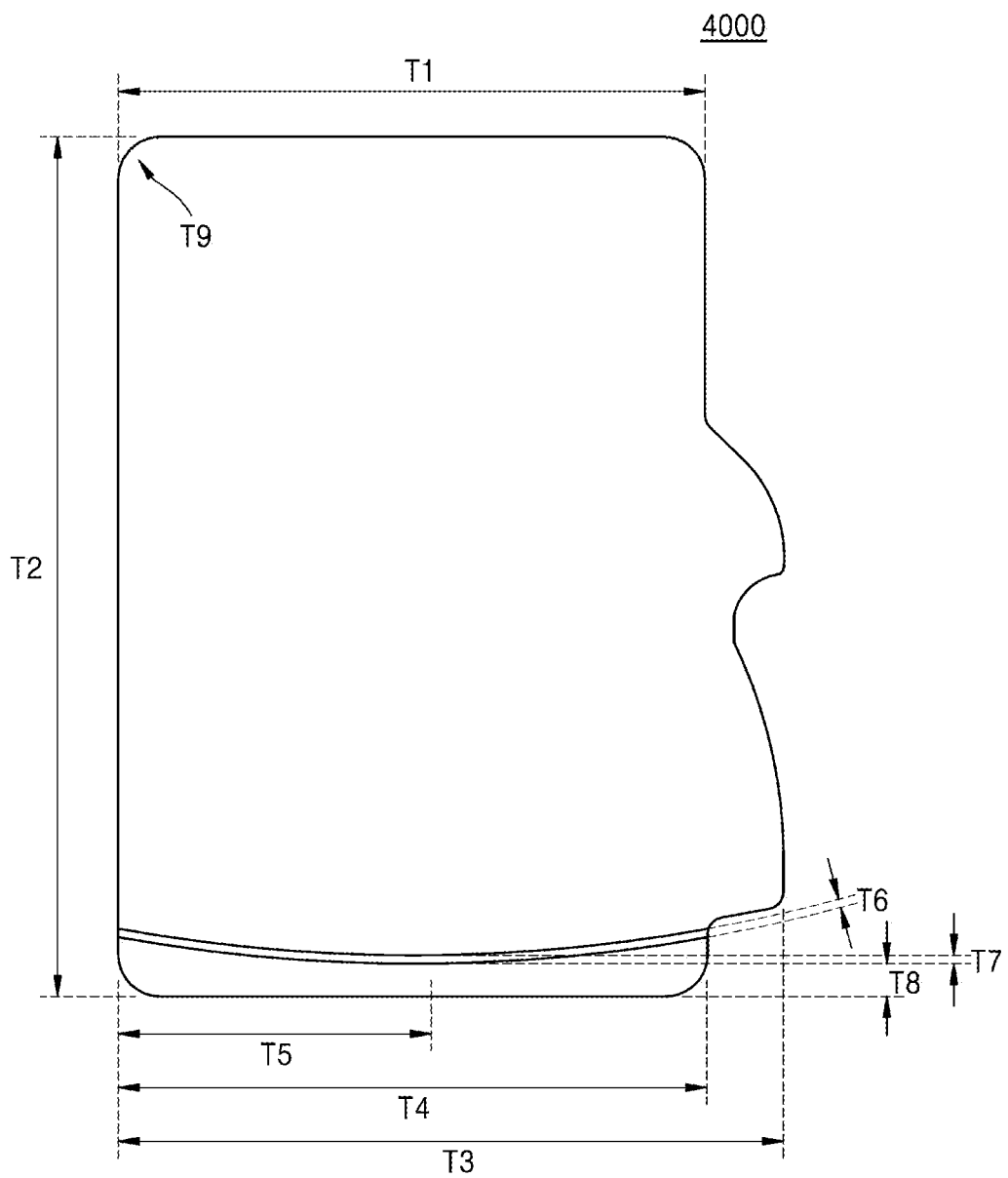
FIGS. 15A to 15C are diagrams for describing a form factor of a UFS card.
Figure 15B:
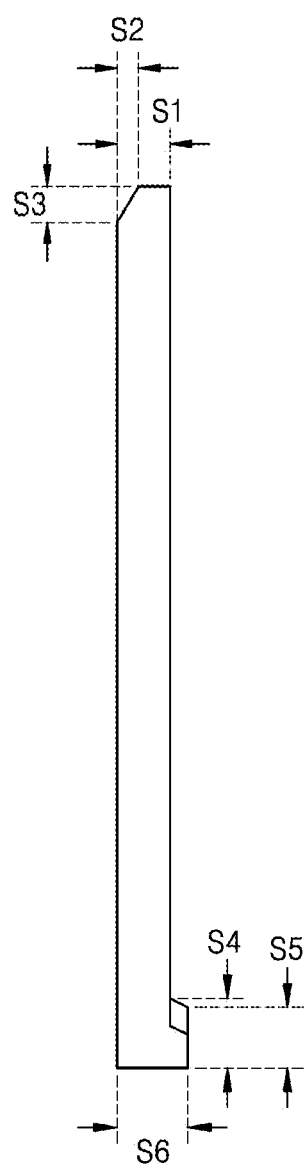
Figure 15C:
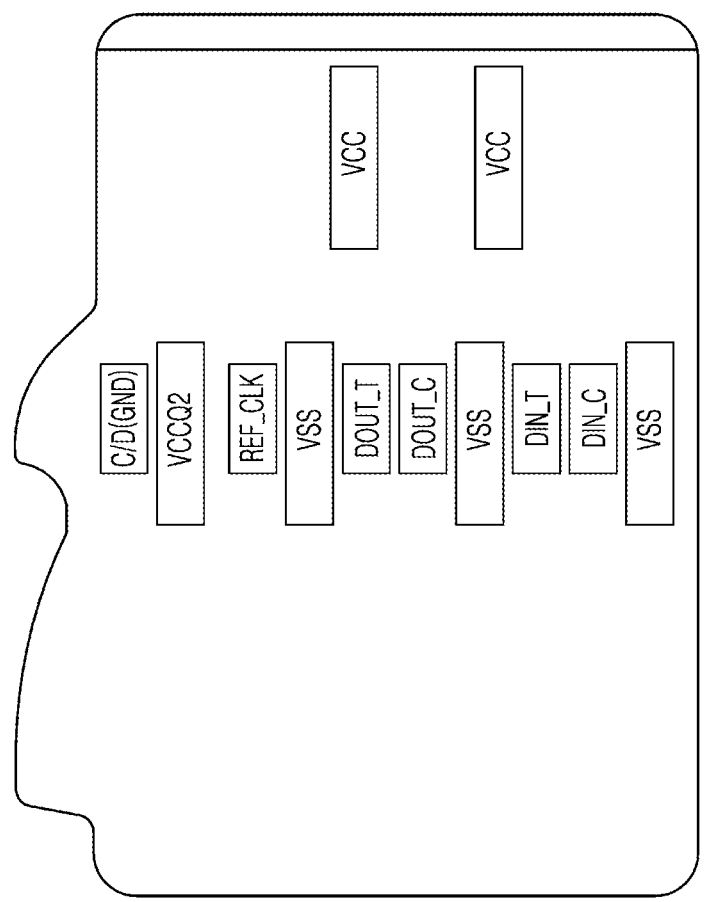

FIGS. 15A to 15C are diagrams for describing a form factor of a UFS card. When the UFS device 2200 described with reference to FIG. 14 is implemented in a form of a UFS card 4000, the exterior appearance of the UFS card 4000 may be as shown in FIGS. 15A to 15C.

FIG. 15A is a top view of the UFS card 4000. Referring to FIG. 15A, the UFS card 4000 generally has a shark-shaped design. In FIG. 15A, the UFS card 4000 may have, for example, dimensions shown in Table 1 below.

TABLE 1

| Item | Dimension (mm) |
|---|---|
| T1 | 9.70 |
| T2 | 15.00 |
| T3 | 11.00 |
| T4 | 9.70 |
| T5 | 5.15 |
| T6 | 0.25 |
| T7 | 0.60 |
| T8 | 0.75 |
| T9 | R0.80 |

FIG. 15B is a side view of the UFS card 4000. In FIG. 15B, the UFS card 4000 may have, for example, dimensions shown in Table 2 below.

TABLE 2

| Item | Dimension (mm) |
|---|---|
| S1 | 0.74 ± 0.06 |
| S2 | 0.30 |
| S3 | 0.52 |
| S4 | 1.20 |
| S5 | 1.05 |
| S6 | 1.00 |

FIG. 15C is a bottom view of the UFS card 4000. Referring to FIG. 15C, a plurality of pins for an electrical contact with a UFS slot may be formed on a bottom surface of the UFS card 4000, and a function of each pin will be described below. By symmetry between a top surface and the bottom surface of the UFS card 4000, some (e.g., T1 to T5 and T9) of the information about the dimensions described with reference to FIG. 15A and Table 1 may also be applied to the bottom view of the UFS card 4000 as shown in FIG. 15C.

A plurality of pins for an electrical connection with a UFS host may be formed on the bottom surface of the UFS card 4000, and according to FIG. 15C, a total number of pins may be 12. Each pin may have a rectangular shape, and a signal name corresponding to each pin is as shown in FIG. 15C. Brief information of each pin may refer to Table 3 below and may also refer to the description made above with reference to FIG. 14.

Figure 16:
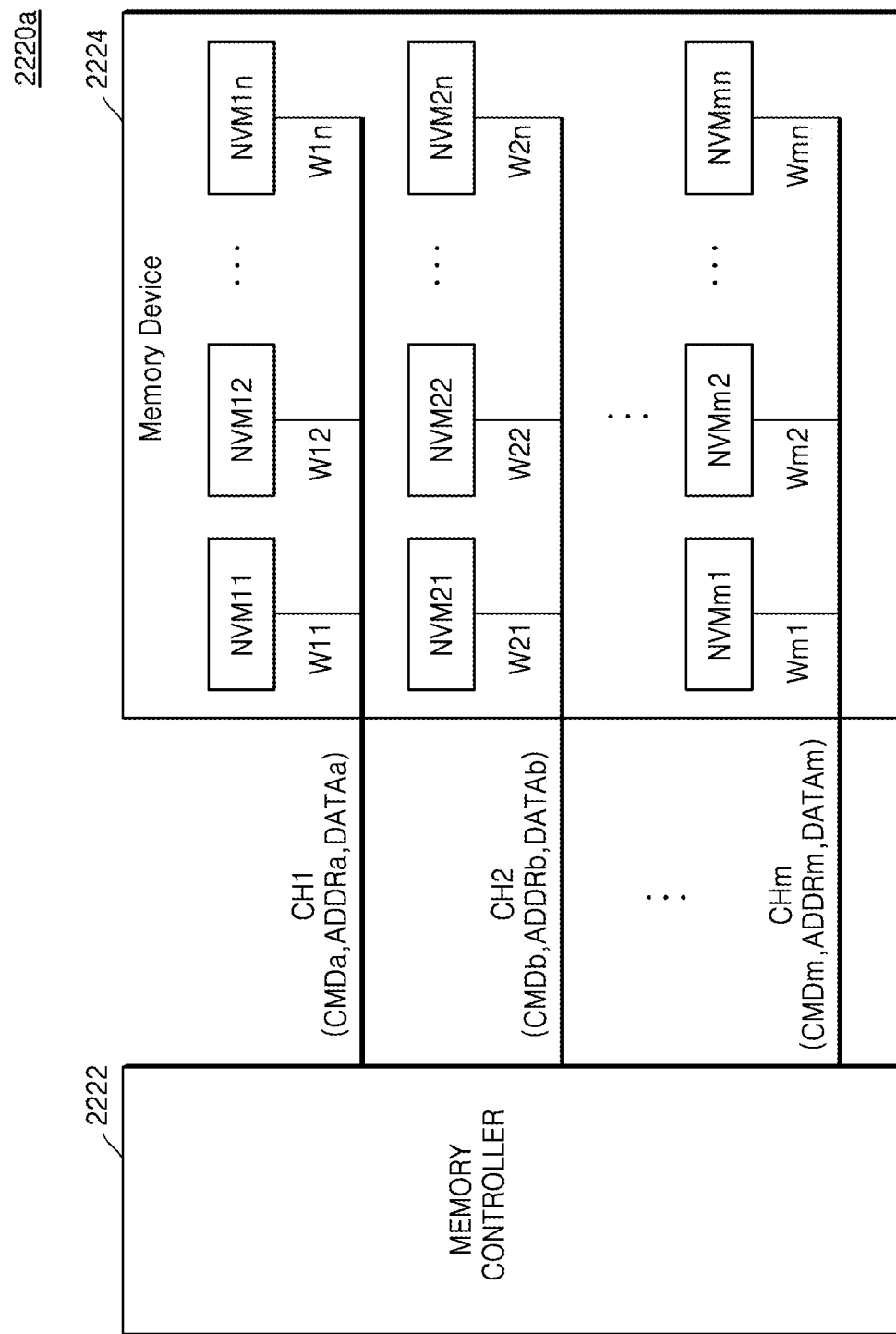
FIG. 16 is a block diagram of a nonvolatile memory (NVM) storage according to at least one example embodiment of the inventive concepts.

FIG. 16 is a block diagram of a NVM storage 2220a according to at least one example embodiment of the inventive concepts.

Referring to FIG. 16, the NVM storage 2220a may include a memory device 2224 and a memory controller 2222. The NVM storage 2220a may support a plurality of channels, e.g., first to mth channels CH1 to CHm, and the memory device 2224 and the memory controller 2222 may be connected to each other through the first to mth channels CH1 to CHm. For example, the NVM storage 2220a may be implemented by a storage device such as an SSD.

The memory device 2224 may include a plurality of NVM devices NVM11 to NVMmn. Each of the plurality of NVM devices NVM11 to NVMmn may be connected to one of the first to mth channels CH1 to CHm through a corresponding way. For example, the NVM devices NVM11 to NVM1n may be connected to the first channel CH1 through ways W11 to W1n, respectively, and the NVM devices NVM21 to NVM2n may be connected to the second channel CH2 through ways W21 to W2n, respectively. In an example embodiment, each of the plurality of NVM devices NVM11 to NVMmn may be implemented in random memory units operable according to an individual command from the memory controller 2222. For example, each of the plurality of NVM devices NVM11 to NVMmn may be implemented by a chip or a die, but at least some example embodiments of the inventive concepts are not limited thereto.

The memory controller 2222 may transmit and receive signals to and from the memory device 2224 through the first to mth channels CH1 to CHm. For example, the memory controller 2222 may transmit commands CMDa~CMDm, addresses ADDRa~ADDRm, and data DATAa~DATAm to the memory device 2224 or receive the data DATAa-~DATAm from the memory device 2224, through the first to mth channels CH1 to CHm.

The memory controller 2222 may select, through a corresponding channel, one of NVM devices connected to the corresponding channel and transmit and receive signals to and from the selected NVM device. For example, the memory controller 2222 may select the NVM device NVM11 from among the NVM devices NVM11 to NVM1n

TABLE 3

| Number | Signal name | Description | Dimension (mm) |
|---|---|---|---|
| 1 | VSS | Ground (GND) | 3.00 × 0.72 ± 0.05 |
| 2 | DIN_C | Differential input signal input from a | 1.50 × 0.72 ± 0.05 |
| 3 | DIN_T | host to the UFS card 4000 (DIN_C denotes a negative node, and DIN_T denotes a positive node) | |
| 4 | VSS | Same as number 1 | 3.00 × 0.72 ± 0.05 |
| 5 | DOUT_C | Differential output signal output from | 1.50 × 0.72 ± 0.05 |
| 6 | DOUT_T | the UFS card 4000 to a host (DOUT_C denotes a negative node, and DOUT_T denotes a positive node) | |
| 7 | VSS | Same as number 1 | 3.00 × 0.72 ± 0.05 |
| 8 | REF_CLK | Reference clock provided from a host to the UFS card 4000 | 1.50 × 0.72 ± 0.05 |
| 9 | VCCQ2 | Power source voltage having a relatively lower value than VCC, which is mainly provided for a PHY interface or a controller | 3.00 × 0.72 ± 0.05 |
| 10 | C/D(GND) | Signal for card detection | 1.50 × 0.72 ± 0.05 |
| 11 | VSS | Same as number 1 | 3.00 × 0.80 ± 0.05 |
| 12 | Vcc | Main power source voltage | | connected to the first channel CH1. The memory controller 2222 may transmit the command CMDa, the address ADDRa, and the data DATAa to the selected NVM device NVM11 or receive the data DATAa from the selected NVM device NVM11, through the first channel CH1.

The memory controller 2222 may, in a parallel manner, transmit and receive signals to and from the memory device 2224 through different channels. For example, the memory controller 2222 may transmit the command CMDb to the memory device 2224 through the second channel CH2 while transmitting the command CMDa to the memory device 2224 through the first channel CH1. For example, the memory controller 2222 may receive the data DATAb from the memory device 2224 through the second channel CH2 while receiving the data DATAa from the memory device 2224 through the first channel CH1.

The memory controller 2222 may control a general operation of the memory device 2224. The memory controller 2222 may control each of the plurality of NVM devices NVM11 to NVMmn connected to the first to mth channels CH1 to CHm by transmitting a signal through the first to mth channels CH1 to CHm. For example, the memory controller 2222 may control one selected from among the NVM devices NVM11 to NVM1n, by transmitting the command CMDa and the address ADDRa through the first channel CH1.

Each of the plurality of NVM devices NVM11 to NVMmn may be operated under control of the memory controller 2222. For example, the NVM device NVM11 may program the data DATAa according to the command CMDa, the address ADDRa, and the data DATAa provided through the first channel CH1. For example, the nonvolatile memory device NVM21 may read the data DATAb according to the command CMDb and the address ADDRb provided through the second channel CH2 and transmit the read data DATAb to the memory controller 2222.

Although FIG. 16 shows that the memory device 2224 communicates with the memory controller 2222 through m channels and includes n NVM devices in correspondence to each channel, the number of channels and the number of NVM devices connected to one channel may be variously changed.

Figure 17:
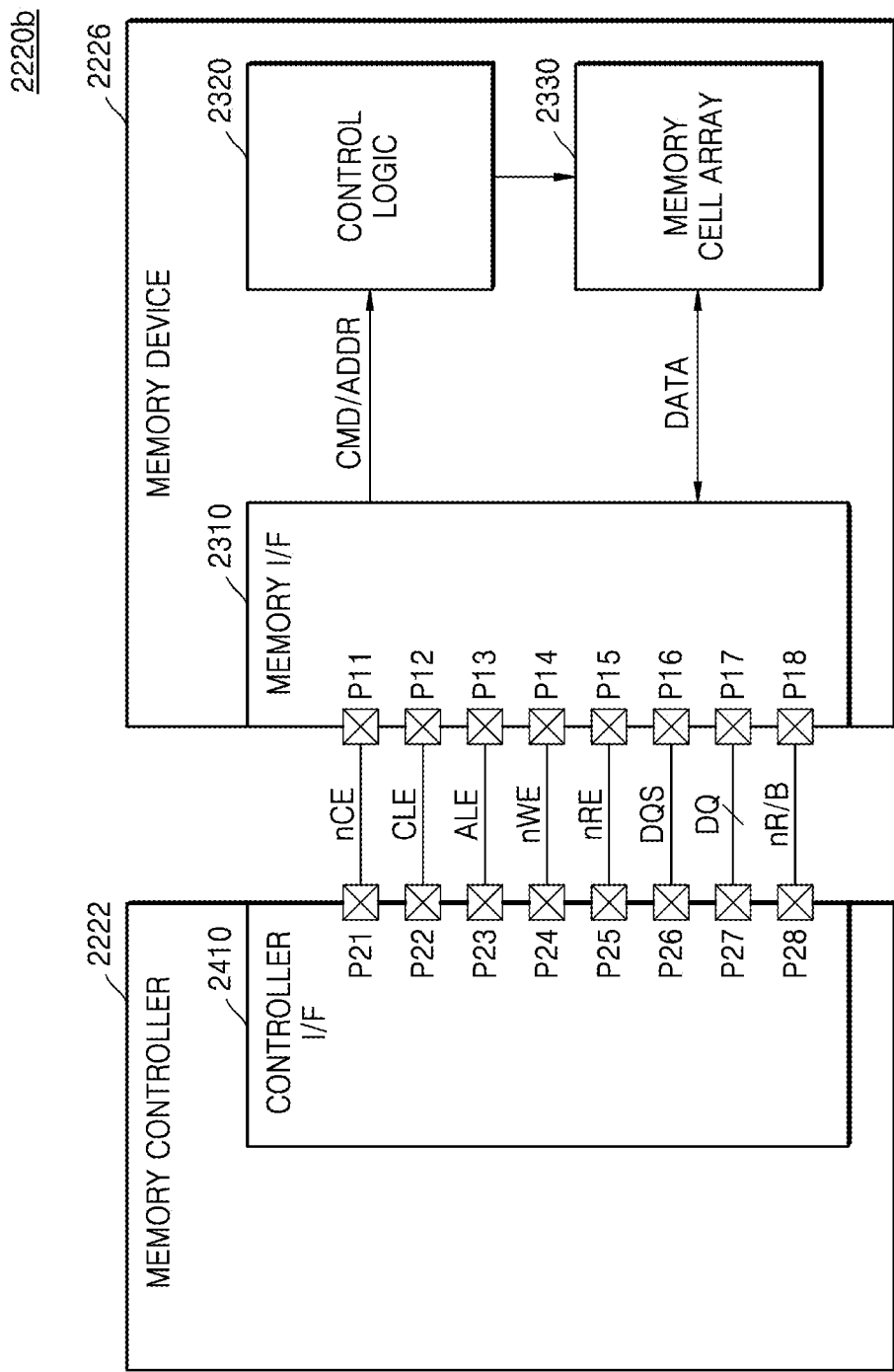
FIG. 17 is a block diagram of an NVM storage according to at least one example embodiment of the inventive concepts.

FIG. 17 is a block diagram of an NVM storage 2220b according to at least one example embodiment of the inventive concepts. Referring to FIG. 17, the NVM storage 2220b may include a memory device 2226 and the memory controller 2222. The memory device 2226 may correspond to one of the plurality of NVM devices NVM11 to NVMmn, which communicates with the memory controller 2222 based on one of the first to mth channels CH1 to CHm of FIG. 16. The memory controller 2222 may correspond to the memory controller 2222 of FIG. 16.

The memory device 2226 may include first to eighth pins P11 to P18, a memory interface circuit 2310, a control logic circuit 2320, and a memory cell array 2330.

The memory interface circuit 2310 may receive a chip enable signal nCE from the memory controller 2222 through the first pin P11. The memory interface circuit 2310 may transmit and receive signals to and from the memory controller 2222 through the second to eighth pins P12 to P18 in response to the chip enable signal nCE. For example, when the chip enable signal nCE is in an enable state (e.g., a low level), the memory interface circuit 2310 may transmit and receive signals to and from the memory controller 2222 through the second to eighth pins P12 to P18.

The memory interface circuit 2310 may receive a command latch enable signal CLE, an address latch enable signal ALE, and a write enable signal nWE from the memory controller 2222 through the second to fourth pins P12 to P14, respectively. The memory interface circuit 2310 may receive or transmit a data signal DQ from or to the memory controller 2222 through the seventh pin P17. A command CMD, an address ADDR, and data DATA may be delivered through the data signal DQ. For example, the data signal DQ may be delivered through a plurality of data signal lines. In this case, the seventh pin P17 may include a plurality of pins corresponding to the plurality of data signal lines.

The memory interface circuit 2310 may obtain the command CMD from the data signal DQ received in an enable period (e.g., a high-level state) of the command latch enable signal CLE, based on toggle timings of the write enable signal nWE. The memory interface circuit 2310 may obtain the address ADDR from the data signal DQ received in an enable period (e.g., a high-level state) of the address latch enable signal ALE, based on toggle timings of the write enable signal nWE.

In an example embodiment, the write enable signal nWE may maintain a static state (e.g., a high level or a low level) and then toggle between the high level and the low level. For example, the write enable signal nWE may toggle in a period in which the command CMD or the address ADDR is transmitted. Accordingly, the memory interface circuit 2310 may obtain the command CMD or the address ADDR based on toggle timings of the write enable signal nWE.

The memory interface circuit 2310 may receive a read enable signal nRE from the memory controller 2222 through the fifth pin P15. The memory interface circuit 2310 may receive or transmit a data strobe signal DQS from or to the memory controller 2222 through the sixth pin P16.

In a data output operation of the memory device 2226, the memory interface circuit 2310 may receive the read enable signal nRE, which toggles, through the fifth pin P15 before outputting the data DATA. The memory interface circuit 2310 may generate the data strobe signal DQS, which toggles, based on the toggling of the read enable signal nRE. For example, the memory interface circuit 2310 may generate the data strobe signal DQS, which starts to toggle after a pre-defined delay (e.g., $T_{DQSRE}$) from a toggling start time of the read enable signal nRE. The memory interface circuit 2310 may transmit the data signal DQ including the data DATA based on toggle timing of the data strobe signal DQS. Accordingly, the data DATA may be aligned with the toggle timing of the data strobe signal DQS and transmitted to the memory controller 2222.

In a data input operation of the memory device 2226, when the data signal DQ including the data DATA is received from the memory controller 2222, the memory interface circuit 2310 may receive the data strobe signal DQS, which toggles, together with the data DATA from the memory controller 2222. The memory interface circuit 2310 may obtain the data DATA from the data signal DQ based on toggle timing of the data strobe signal DQS. For example, the memory interface circuit 2310 may obtain the data DATA by sampling the data signal DQ at a leading edge and a trailing edge of the data strobe signal DQS.

The memory interface circuit 2310 may transmit a ready/busy output signal nR/B to the memory controller 2222 through the eighth pin P18. The memory interface circuit 2310 may transmit state information of the memory device 2226 to the memory controller 2222 through the ready/busy output signal nR/B. When the memory device 2226 is in a busy state (e.g., while performing internal operations of the memory device 2226), the memory interface circuit 2310 may transmit the ready/busy output signal nR/B indicating the busy state to the memory controller 2222. When the memory device 2226 is in a ready state (e.g., when internal operations of the memory device 2226 are not performed or are completed), the memory interface circuit 2310 may transmit the ready/busy output signal nR/B indicating the ready state to the memory controller 2222. For example, while the memory device 2226 is reading the data DATA from the memory cell array 2330 in response to a page read command, the memory interface circuit 2310 may transmit the ready/busy output signal nR/B indicating the busy state (e.g., the low level) to the memory controller 2222. For example, while the memory device 2226 is programming the data DATA to the memory cell array 2330 in response to a program command, the memory interface circuit 2310 may transmit the ready/busy output signal nR/B indicating the busy state to the memory controller 2222.

The control logic circuit 2320 may generally control various kinds of operations of the memory device 2226. The control logic circuit 2320 may receive the command/address CMD/ADDR from the memory interface circuit 2310. The control logic circuit 2320 may generate control signals for controlling the other components in the memory device 2226, in response to the received command/address CMD/ADDR. For example, the control logic circuit 2320 may generate various kinds of control signals for programming or reading the data DATA to or from the memory cell array 2330.

The memory cell array 2330 may store the data DATA obtained from the memory interface circuit 2310, under control of the control logic circuit 2320. The memory cell array 2330 may output the stored data DATA to the memory interface circuit 2310 under control of the control logic circuit 2320.

The memory cell array 2330 may include a plurality of memory cells. For example, the plurality of memory cells may be flash memory cells. However, at least some example embodiments of the inventive concepts are not limited thereto, and the plurality of memory cells may be RRAM cells, ferroelectric random access memory (FRAM) cells, PRAM cells, thyristor random access memory (TRAM) cells, or MRAM cells. Hereinafter, at least some example embodiments of the inventive concepts will be described based on an embodiment in which the plurality of memory cells are NAND flash memory cells.

The memory controller 2222 may include first to eighth pins P21 to P28 and a controller interface circuit 2410. The first to eighth pins P21 to P28 may correspond to the first to eighth pins P11 to P18 in the memory device 2226.

The controller interface circuit 2410 may transmit the chip enable signal nCE to the memory device 2226 through the first pin P21. The controller interface circuit 2410 may transmit and receive, through the second to eighth pins P22 to P28, signals to and from the memory device 2226 selected based on the chip enable signal nCE.

The controller interface circuit 2410 may transmit the command latch enable signal CLE, the address latch enable signal ALE, and the write enable signal nWE to the memory device 2226 through the second to fourth pins P22 to P24, respectively. The controller interface circuit 2410 may transmit or receive the data signal DQ to or from the memory device 2226 through the seventh pin P27.

The controller interface circuit 2410 may transmit, to the memory device 2226, the data signal DQ including the command CMD or the address ADDR together with the write enable signal nWE, which toggles. The controller interface circuit 2410 may transmit the data signal DQ including the command CMD to the memory device 2226 according to transmission of the command latch enable signal CLE having an enable state, and transmit the data signal DQ including the address ADDR to the memory device 2226 according to transmission of the address latch enable signal ALE having an enable state.

The controller interface circuit 2410 may transmit the read enable signal nRE to the memory device 2226 through the fifth pin P25. The controller interface circuit 2410 may receive or transmit the data strobe signal DQS from or to the memory device 2226 through the sixth pin P26.

In a data output operation of the memory device 2226, the controller interface circuit 2410 may generate the read enable signal nRE, which toggles, and transmit the read enable signal nRE to the memory device 2226. For example, the controller interface circuit 2410 may generate the read enable signal nRE, which changes from the static state (e.g., the high level or the low level) to a toggle state, before the data DATA is output. Accordingly, the memory device 2226 may generate the data strobe signal DQS, which toggles, based on the read enable signal nRE. The controller interface circuit 2410 may receive, from the memory device 2226, the data signal DQ including the data DATA together with the data strobe signal DQS, which toggles. The controller interface circuit 2410 may obtain the data DATA from the data signal DQ based on toggle timing of the data strobe signal DQS.

In a data input operation of the memory device 2226, the controller interface circuit 2410 may generate the data strobe signal DQS, which toggles. For example, the controller interface circuit 2410 may generate the data strobe signal DQS, which changes from the static state (e.g., the high level or the low level) to the toggle state, before the data DATA is transmitted. The controller interface circuit 2410 may transmit the data signal DQ including the data DATA to the memory device 2226, based on toggle timings of the data strobe signal DQS.

The controller interface circuit 2410 may receive the ready/busy output signal nR/B from the memory device 2226 through the eighth pin P28. The controller interface circuit 2410 may determine state information of the memory device 2226 based on the ready/busy output signal nR/B.

Figure 18:
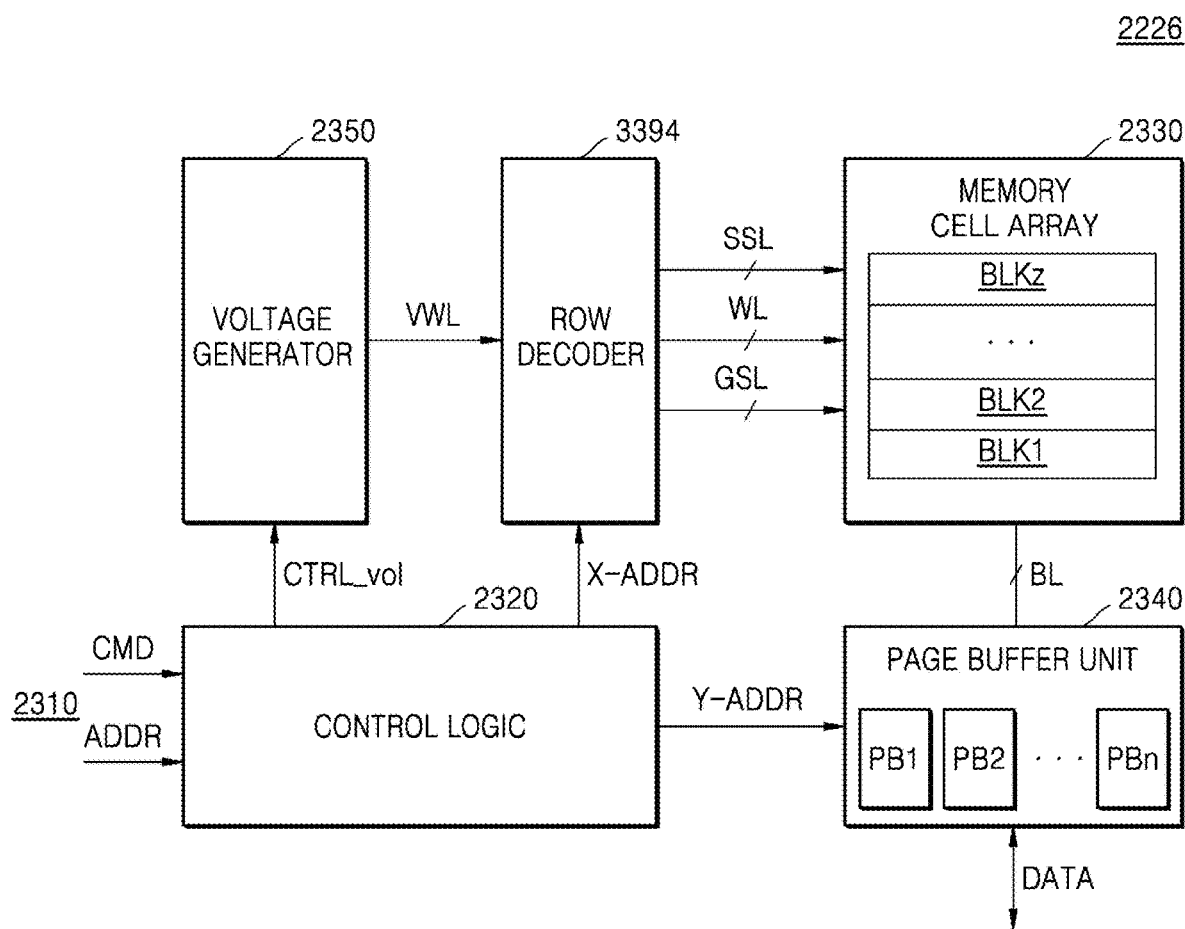
FIG. 18 is a block diagram of a memory device of FIG. 17.

FIG. 18 is a block diagram of the memory device 2226 of FIG. 17. Referring to FIG. 18, the memory device 2226 may include the control logic circuit 2320, the memory cell array 2330, a page buffer unit 2340, a voltage generator 2350, and a row decoder 3394. Although not shown in FIG. 18, the memory device 2226 may further include the memory interface circuit 2310 shown in FIG. 17 and in addition, the memory device 2226 may further include a column logic, a pre-decoder, a temperature sensor, a command decoder, an address decoder, and the like.

The control logic circuit 2320 may generally control various kinds of operations of the memory device 2226. The control logic circuit 2320 may output various kinds of control signals in response to the command CMD and/or the address ADDR from the memory interface circuit 2310. For example, the control logic circuit 2320 may output a voltage control signal CTRL_vol, a row address X-ADDR, and a column address Y-ADDR.

The memory cell array 2330 may include a plurality of memory blocks BLK1 to BLKz (z is a positive integer), and each of the plurality of memory blocks BLK1 to BLKz may include a plurality of memory cells. The memory cell array 2330 may be connected to the page buffer unit 2340 through bit lines BL and connected to the row decoder 3394 through word lines WL, string select lines SSL, and ground select lines GSL.

In an example embodiment, the memory cell array 2330 may include a 3D memory cell array, and the 3D memory cell array may include a plurality of NAND strings. Each NAND string may include memory cells respectively connected to word lines vertically stacked on a substrate. U.S. Pat. Nos. 7,679,133, 8,553,466, 8,654,587, and 8,559,235 and US Patent Application No. 2011/0233648, herein incorporated in their entirety by reference, are cited in the specification. In an example embodiment, the memory cell array 2330 may include a 2D memory cell array, and the 2D memory cell array may include a plurality of NAND strings arranged in row and column directions.

The page buffer unit 2340 may include a plurality of page buffers PB1 to PBn (n is an integer greater than or equal to 3), and the plurality of page buffers PB1 to PBn may be connected to memory cells through a plurality of bit lines BL, respectively. The page buffer unit 2340 may select at least one bit line BL from among the plurality of bit lines BL in response to the column address Y-ADDR. The page buffer unit 2340 may operate as a write driver or a sense amplifier according to an operation mode. For example, in a program operation, the page buffer unit 2340 may apply, to a selected bit line BL, a bit line voltage corresponding to data to be programmed. In a read operation, the page buffer unit 2340 may sense data stored in a memory cell by sensing a current or a voltage of a selected bit line BL.

The voltage generator 2350 may generate various types of voltages for performing program, read, and discard operations, based on the voltage control signal CTRL_vol. For example, the voltage generator 2350 may generate a program voltage, a read voltage, a program verify voltage, a discard voltage, or the like as a word line voltage VWL.

The row decoder 3394 may select one of a plurality of word lines WL in response to the row address X-ADDR and select one of a plurality of string select lines SSL. For example, in a program operation, the row decoder 3394 may apply the program voltage and the program verify voltage to a selected word line WL, and in a read operation, the row decoder 3394 may apply the read voltage to a selected word line WL.

Figure 19:
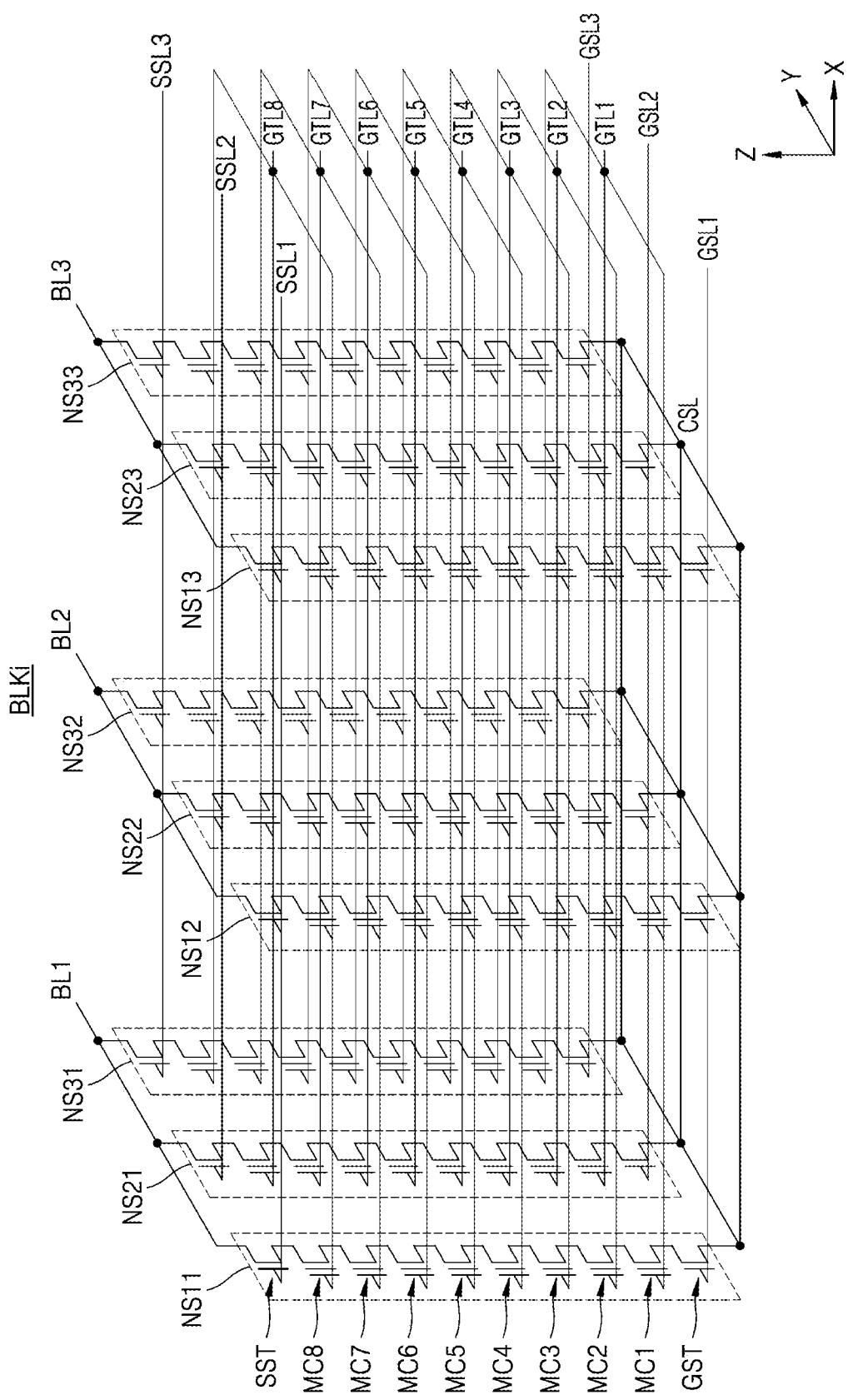
FIG. 19 is a diagram for describing a three-dimensional vertical NAND (3D V-NAND) structure applicable to a UFS device, according to at least one example embodiment of the inventive concepts.

FIG. 19 is a diagram for describing a 3D V-NAND structure applicable to a UFS device, according to at least one example embodiment of the inventive concepts. When a storage module in the UFS device is implemented by 3D V-NAND-type flash memory, each of a plurality of memory blocks included in the storage module may be represented by an equivalent circuit as shown in FIG. 19.

A memory block BLKi shown in FIG. 19 indicates a 3D memory block formed in a 3D structure on a substrate. For example, a plurality of memory NAND strings included in the memory block BLKi may be formed in a direction vertical to the substrate.

Referring to FIG. 19, the memory block BLKi may include a plurality of memory NAND strings NS11 to NS33 connected between bit lines BL1, BL2, and BL3 and a common source line CSL. Each of the plurality of memory NAND strings NS11 to NS33 may include a string select transistor SST, a plurality of memory cells MC1, MC2, . . . , MC8, and a ground select transistor GST. Although FIG. 19 shows that each of the plurality of memory NAND strings NS11 to NS33 includes eight memory cells MC1, MC2, . . . , MC8, at least some example embodiments of the inventive concepts are not necessarily limited thereto.

The string select transistor SST may be connected to a corresponding string select line SSL1, SSL2, or SSL3. The plurality of memory cells MC1, MC2, . . . , MC8 may be connected to corresponding gate lines GTL1, GTL2, . . . , GTL8, respectively. The gate lines GTL1, GTL2, . . . , GTL8 may correspond to word lines, and some of the gate lines GTL1, GTL2, . . . , GTL8 may correspond to dummy word lines. The ground select transistor GST may be connected to a corresponding ground select line GSL1, GSL2, or GSL3. The string select transistor SST may be connected to a corresponding bit line BL1, BL2, or BL3, and the ground select transistor GST may be connected to the common source line CSL.

A word line (e.g., WL1) of the same height may be commonly connected, and the ground select lines GSL1, GSL2, and GSL3 and the string select lines SSL1, SSL2, and SSL3 may be individually separated. Although FIG. 19 shows that the memory block BLKi is connected to eight gate lines GTL1, GTL2, . . . , GTL8 and three bit lines BL1, BL2, and BL3, at least some example embodiments of the inventive concepts are not necessarily limited thereto.

Figure 20:
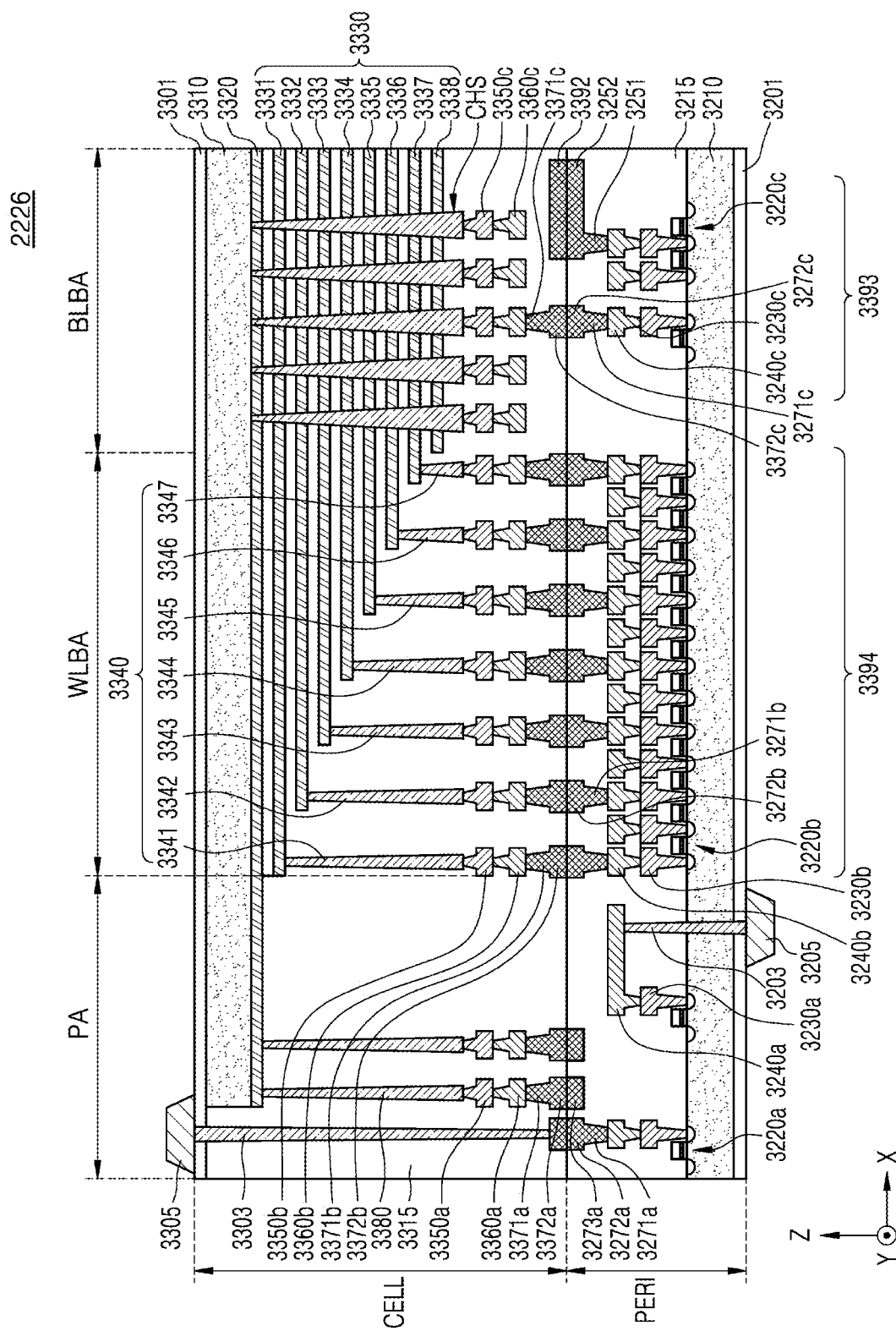
FIG. 20 is a cross-sectional view of a BVNAND structure applicable to a UFS device, according to at least one example embodiment of the inventive concepts.

FIG. 20 is a cross-sectional view of a BVNAND structure applicable to a UFS device, according to at least one example embodiment of the inventive concepts.

Referring to FIG. 20, a memory device 2226 may have a chip-to-chip (C2C) structure. The C2C structure may refer to a structure formed by manufacturing an upper chip including a cell region CELL on a first wafer, manufacturing a lower chip including a peripheral circuit region PERI on a second wafer, separate from the first wafer, and then bonding the upper chip and the lower chip to each other. Here, the bonding process may include a method of electrically connecting a bonding metal formed on an uppermost metal layer of the upper chip and a bonding metal formed on an uppermost metal layer of the lower chip. For example, when the bonding metals may include copper (Cu) using a Cu-to-Cu bonding. The example embodiment, however, may not be limited thereto. For example, the bonding metals may also be formed of aluminum (Al) or tungsten (W).

Each of the peripheral circuit region PERI and the cell region CELL of the memory device 2226 may include an external pad bonding area PA, a word line bonding area WLBA, and a bit line bonding area BLBA.

The peripheral circuit region PERI may include a first substrate 3210, an interlayer insulating layer 3215, a plurality of circuit elements 3220a, 3220b, and 3220c formed on the first substrate 3210, first metal layers 3230a, 3230b, and 3230c respectively connected to the plurality of circuit elements 3220a, 3220b, and 3220c, and second metal layers 3240a, 3240b, and 3240c formed on the first metal layers 3230a, 3230b, and 3230c. In an example embodiment, the first metal layers 3230a, 3230b, and 3230c may be formed of tungsten having relatively high electrical resistivity, and the second metal layers 3240a, 3240b, and 3240c may be formed of copper having relatively low electrical resistivity.

In an example embodiment illustrate in FIG. 20, although only the first metal layers 3230a, 3230b, and 3230c and the second metal layers 3240a, 3240b, and 3240c are shown and described, the example embodiment is not limited thereto, and one or more additional metal layers may be further formed on the second metal layers 3240a, 3240b, and 3240c. At least a portion of the one or more additional metal layers formed on the second metal layers 3240a, 3240b, and 3240c may be formed of aluminum or the like having a lower electrical resistivity than those of copper forming the second metal layers 3240a, 3240b, and 3240c.

The interlayer insulating layer 3215 may be disposed on the first substrate 3210 and cover the plurality of circuit elements 3220a, 3220b, and 3220c, the first metal layers 3230a, 3230b, and 3230c, and the second metal layers 3240a, 3240b, and 3240c. The interlayer insulating layer 3215 may include an insulating material such as silicon oxide, silicon nitride, or the like.

Lower bonding metals 3271b and 3272b may be formed on the second metal layer 3240b in the word line bonding area WLBA. In the word line bonding area WLBA, the lower bonding metals 3271b and 3272b in the peripheral circuit region PERI may be electrically bonded to upper bonding metals 3371b and 3372b of the cell region CELL. The lower bonding metals 3271b and 3272b and the upper bonding metals 3371b and 3372b may be formed of aluminum, copper, tungsten, or the like. Further, the upper bonding metals 3371b and 3372b in the cell region CELL may be referred as first metal pads and the lower bonding metals 3271b and 3272b in the peripheral circuit region PERI may be referred as second metal pads.

The cell region CELL may include at least one memory block. The cell region CELL may include a second substrate 3310 and a common source line 3320. On the second substrate 3310, a plurality of word lines 3331 to 3338 (e.g., 3330) may be stacked in a direction (a Z-axis direction), perpendicular to an upper surface of the second substrate 3310. At least one string select line and at least one ground select line may be arranged on and below the plurality of word lines 3330, respectively, and the plurality of word lines 3330 may be disposed between the at least one string select line and the at least one ground select line.

In the bit line bonding area BLBA, a channel structure CH may extend in a direction (a Z-axis direction), perpendicular to the upper surface of the second substrate 3310, and pass through the plurality of word lines 3330, the at least one string select line, and the at least one ground select line. The channel structure CH may include a data storage layer, a channel layer, a buried insulating layer, and the like, and the channel layer may be electrically connected to a first metal layer 3350c and a second metal layer 3360c. For example, the first metal layer 3350c may be a bit line contact, and the second metal layer 3360c may be a bit line. In an example embodiment, the bit line 3360c may extend in a first direction (a Y-axis direction), parallel to the upper surface of the second substrate 3310.

In an example embodiment illustrated in FIG. 20, an area in which the channel structure CH, the bit line 3360c, and the like are disposed may be defined as the bit line bonding area BLBA. In the bit line bonding area BLBA, the bit line 3360c may be electrically connected to the circuit elements 3220c providing a page buffer 3393 in the peripheral circuit region PERI. The bit line 3360c may be connected to upper bonding metals 3371c and 3372c in the cell region CELL, and the upper bonding metals 3371c and 3372c may be connected to lower bonding metals 3271c and 3272c connected to the circuit elements 3220c of the page buffer 3393.

In the word line bonding area WLBA, the plurality of word lines 3330 may extend in a second direction (an X-axis direction), parallel to the upper surface of the second substrate 3310 and perpendicular to the first direction, and may be connected to a plurality of cell contact plugs 3341 to 3347 (e.g., 3340). The plurality of word lines 3330 and the plurality of cell contact plugs 3340 may be connected to each other in pads provided by at least a portion of the plurality of word lines 3330 extending in different lengths in the second direction. A first metal layer 3350b and a second metal layer 3360b may be connected to an upper portion of the plurality of cell contact plugs 3340 connected to the plurality of word lines 3330, sequentially. The plurality of cell contact plugs 3340 may be connected to the peripheral circuit region PERI by the upper bonding metals 3371b and 3372b of the cell region CELL and the lower bonding metals 3271b and 3272b of the peripheral circuit region PERI in the word line bonding area WLBA.

The plurality of cell contact plugs 3340 may be electrically connected to the circuit elements 3220b forming a row decoder 3394 in the peripheral circuit region PERI. In an example embodiment, operating voltages of the circuit elements 3220b of the row decoder 3394 may be different than operating voltages of the circuit elements 3220c forming the page buffer 3393. For example, operating voltages of the circuit elements 3220c forming the page buffer 3393 may be greater than operating voltages of the circuit elements 3220b forming the row decoder 3394.

A common source line contact plug 3380 may be disposed in the external pad bonding area PA. The common source line contact plug 3380 may be formed of a conductive material such as a metal, a metal compound, polysilicon, or the like, and may be electrically connected to the common source line 3320. A first metal layer 3350a and a second metal layer 3360a may be stacked on an upper portion of the common source line contact plug 3380, sequentially. For example, an area in which the common source line contact plug 3380, the first metal layer 3350a, and the second metal layer 3360a are disposed may be defined as the external pad bonding area PA.

Input-output pads 33205 and 3305 may be disposed in the external pad bonding area PA. Referring to FIG. 20, a lower insulating film 3201 covering a lower surface of the first substrate 3210 may be formed below the first substrate 3210, and a first input-output pad 3205 may be formed on the lower insulating film 3201. The first input-output pad 3205 may be connected to at least one of the plurality of circuit elements 3220a, 3220b, and 3220c disposed in the peripheral circuit region PERI through a first input-output contact plug 3203, and may be separated from the first substrate 3210 by the lower insulating film 3201. In addition, a side insulating film may be disposed between the first input-output contact plug 3203 and the first substrate 3210 to electrically separate the first input-output contact plug 3203 and the first substrate 3210.

Referring to FIG. 20, an upper insulating film 3301 covering the upper surface of the second substrate 3310 may be formed on the second substrate 3310, and a second input-output pad 3305 may be disposed on the upper insulating layer 3301. The second input-output pad 3305 may be connected to at least one of the plurality of circuit elements 3220a, 3220b, and 3220c disposed in the peripheral circuit region PERI through a second input-output contact plug 3303. In the example embodiment, the second input-output pad 3305 is electrically connected to a circuit element 3220a.

According to embodiments, the second substrate 3310 and the common source line 3320 may not be disposed in an area in which the second input-output contact plug 3303 is disposed. Also, the second input-output pad 3305 may not overlap the word lines 3330 in the third direction (the Z-axis direction). Referring to FIG. 20, the second input-output contact plug 3303 may be separated from the second substrate 3310 in a direction, parallel to the upper surface of the second substrate 3310, and may pass through the interlayer insulating layer 3315 of the cell region CELL to be connected to the second input-output pad 3305.

According to embodiments, the first input-output pad 3205 and the second input-output pad 3305 may be selectively formed. For example, the memory device 2226 may include only the first input-output pad 3205 disposed on the first substrate 3210 or the second input-output pad 3305 disposed on the second substrate 3310. Alternatively, the memory device 2226 may include both the first input-output pad 3205 and the second input-output pad 3305.

A metal pattern provided on an uppermost metal layer may be provided as a dummy pattern or the uppermost metal layer may be absent, in each of the external pad bonding area PA and the bit line bonding area BLBA, respectively included in the cell region CELL and the peripheral circuit region PERI.

In the external pad bonding area PA, the memory device 2226 may include a lower metal pattern 3273a, corresponding to an upper metal pattern 3372a formed in an uppermost metal layer of the cell region CELL, and having the same cross-sectional shape as the upper metal pattern 3372a of the cell region CELL so as to be connected to each other, in an uppermost metal layer of the peripheral circuit region PERI. In the peripheral circuit region PERI, the lower metal pattern 3273a formed in the uppermost metal layer of the peripheral circuit region PERI may not be connected to a contact. Similarly, in the external pad bonding area PA, an upper metal pattern 3372a, corresponding to the lower metal pattern 3273a formed in an uppermost metal layer of the peripheral circuit region PERI, and having the same shape as a lower metal pattern 3273a of the peripheral circuit region PERI, may be formed in an uppermost metal layer of the cell region CELL.

The lower bonding metals 3271b and 3272b may be formed on the second metal layer 3240b in the word line bonding area WLBA. In the word line bonding area WLBA, the lower bonding metals 3271b and 3272b of the peripheral circuit region PERI may be electrically connected to the upper bonding metals 3371b and 3372b of the cell region CELL by a Cu-to-Cu bonding.

Further, in the bit line bonding area BLBA, an upper metal pattern 3392, corresponding to a lower metal pattern 3252 formed in the uppermost metal layer of the peripheral circuit region PERI, and having the same cross-sectional shape as the lower metal pattern 3252 of the peripheral circuit region PERI, may be formed in an uppermost metal layer of the cell region CELL. A contact may not be formed on the upper metal pattern 3392 formed in the uppermost metal layer of the cell region CELL.

In an example embodiment, corresponding to a metal pattern formed in an uppermost metal layer in one of the cell region CELL and the peripheral circuit region PERI, a reinforcement metal pattern having the same cross-sectional shape as the metal pattern may be formed in an uppermost metal layer in the other one of the cell region CELL and the peripheral circuit region PERI. A contact may not be formed on the reinforcement metal pattern.

Example embodiments of the inventive concepts having thus been described, it will be obvious that the same may be varied in many ways. Such variations are not to be regarded as a departure from the intended spirit and scope of example embodiments of the inventive concepts, and all such modifications as would be obvious to one skilled in the art are intended to be included within the scope of the following claims.

What is claimed is:

1. A link startup method of a storage device connected to a host through a plurality of lanes, the method comprising:
    performing an initialization operation in the storage device;
    establishing data communication through a connected transmission lane and a connected reception lane among the plurality of lanes;
    transmitting a high speed link up message to the host through a connected transmission lane of the storage device; and
    performing a link startup operation in a high speed mode through the connected transmission lane of the storage device and a connected reception lane of the host, based on the high speed link up message transmitted by the storage device,
    wherein the transmitting of the seed link up message to the host through the connected transmission lane of the storage device includes transitioning a line in the connected transmission lane of the storage device from a zero differential line voltage DIF-Z to an activate period having a negative differential line voltage DIF-N,
    wherein, when a length of the activate period is less than a second time, the connected transmission lane of the storage device and the connected reception lane of the host enter the high speed mode, and, when the length of the activate period is the second time or more, the connected transmission lane of the storage device and the connected reception lane of the host enter a low speed mode.

2. The method of claim 1, further comprising:
    receiving a low speed link up message from the host through the connected reception lane of the storage device; and
    performing a link startup operation in a low speed mode through the connected transmission lane of the host and the connected reception lane of the storage device, based on the low speed link up message.

3. The method of claim 2, wherein the receiving of the low speed link up message from the host through the connected reception lane of the storage device includes receiving, through the connected reception lane of the storage device, a low speed link startup primitive.

4. The method of claim 3, wherein the low speed link startup primitive is received in a first trigger event of a link startup sequence, and
    the first trigger event of the link startup sequence is performed such that that a physical lane number of the connected transmission lane of the host is transmitted to the connected reception lane of the storage device.

5. The method of claim 1, wherein the second time is set to 0.9 ms.

6. The method of claim 1, wherein the second time is set to 1.6 ms.

7. The method of claim 1, wherein the performing of the initialization operation in the storage device includes reading initialization information stored in a nonvolatile memory embedded in the storage device and setting the read initialization information in a configuration register, when booting the storage device.

8. The method of claim 7, wherein the initialization information includes at least one of protection information about whether to prohibit storing or erasing of data of the nonvolatile memory, trimming data for trimming an operating voltage level in an operation mode, column repair information for repairing a failed bit line, or information about a bad block including bad memory cells.

9. A link startup method of a host connected to a storage device through at least one lane, the method comprising:
    performing initialization in a high speed mode in the host;
    establishing data communication through a connected transmission lane and a connected reception lane among the at least one lane;

after performing the initialization, determining whether a high speed link up message is received from the storage device through a connected reception lane of the host;

recognizing the connected reception lane through which the high speed link up message is received from the storage device, as a result of the determination; and performing a link startup operation in the high speed mode through a connected transmission lane of the storage device and the connected reception lane of the host, in response to the recognizing of the connected reception lane through which the high speed link up message is received.

10. The method of claim 9, wherein the determining of whether the high speed link up message is received from the storage device through the connected reception lane of the host comprises:

transitioning a line in the connected transmission lane of the storage device from a zero differential line voltage DIF-Z to a negative differential line voltage DIF-N and then to a line-reset period having a positive differential line voltage DIF-P, wherein a length of the line-reset period is set to a first time or more.

11. The method of claim 10, wherein the first time is set to 3.1 ms.

12. The method of claim 9, wherein the determining of whether a high speed link up message is received from the storage device through the connected reception lane of the host includes transitioning a line in the connected transmission lane of the storage device from a zero differential line voltage DIF-Z to an activate period having a negative differential line voltage DIF-N, wherein a length of the activate period is set to less than a second time.

13. The method of claim 12, wherein the second time is set to 0.9 MS.

14. The method of claim 12, wherein the second time is set to 1.6 MS.

15. The method of claim 9, wherein the determining of whether the high speed link up message is received from the storage device through the connected reception lane of the host comprises:

receiving a high speed link startup primitive through the connected reception lane of the host.

16. The method of claim 15, wherein the high speed link startup primitive is received in a first trigger event of a link startup sequence, and the first trigger event of the link startup sequence is performed such that a physical lane number of the connected transmission lane of the storage device is received by the connected reception lane of the host.

17. The method of claim 9, wherein the recognizing of the connected reception lane through which the high speed link up message is received from the storage device includes receiving a high speed link startup primitive by the host within a third time from a reset signal release.

* * * * *